(12) United States Patent
Wong et al.

(10) Patent No.: US 7,996,404 B2
(45) Date of Patent: Aug. 9, 2011

(54) SYSTEM AND METHOD FOR DETECTING AND ANALYZING PATTERN RELATIONSHIPS

(75) Inventors: Andrew Wong, Waterloo (CA); Chung Lam Li, Waterloo (CA)

(73) Assignee: Pattern Discovery Technologies Inc., Waterloo (CA)

( * ) Notice: Subject to any disclaimer, the term of this patent is extended or adjusted under 35 U.S.C. 154(b) by 395 days.

(21) Appl. No.: 12/320,538

(22) Filed: Jan. 28, 2009

(65) Prior Publication Data
US 2010/0010985 A1   Jan. 14, 2010

Related U.S. Application Data

(63) Continuation of application No. PCT/CA2007/001342, filed on Jul. 30, 2007.

(60) Provisional application No. 60/833,780, filed on Jul. 28, 2006, provisional application No. 60/862,087, filed on Oct. 19, 2006.

(51) Int. Cl.
*G06F 17/30* (2006.01)

(52) U.S. Cl. ...................................... 707/737

(58) Field of Classification Search ........................ None
See application file for complete search history.

(56) References Cited

U.S. PATENT DOCUMENTS

2004/0049504 A1   3/2004   Hellerstein et al.
2005/0027710 A1   2/2005   Ma et al.

OTHER PUBLICATIONS

Hwang et al.: "Uncertain Fuzzy Clustering: Interval Type-2 Fuzzy Approach to C-Means", IEEE Transactions on Fuzzy systems, vol. 15, Issue 1, Feb. 2007, p. 107-120.

*Primary Examiner* — Bai D. Vu
(74) *Attorney, Agent, or Firm* — Grant Tisdall; Gowling Lafleur Henderson LLP

(57) ABSTRACT

In its broad aspect, the invention provides a method for analyzing relationships among patterns within a data set having a set of samples and associated attribute values defining each attribute of each said sample. The method comprises receiving at an input at least two patterns; defining a data cluster within the data set for each of said at least two patterns, each defined data cluster having samples with attribute values associated with a corresponding pattern of said at least two patterns; grouping at least some of the samples of each defined data cluster with one another to generate a resultant data cluster; and calculating a variation between the attribute values of a first set of samples and the attribute values of a second set of samples within said resultant data cluster, the attribute values of the first set of samples and the second set of samples corresponding to the same attribute.

39 Claims, 22 Drawing Sheets

| Case | 1 | 2 | 3 | 4 | 5 | 6 | 7 |
|---|---|---|---|---|---|---|---|
| $d_T(i,j)$ | 0 | 10 | 20 | 0 | 10 | 20 | 20 |
| $d_G(i,j)$ | 0 | 0.67 | 1 | 0 | 0.67 | 1 | 1 |
| $d_R(i,j)$ | 0 | 2 | $\infty$ | 0 | 2 | $\infty$ | $\infty$ |
| $d_{RC}(i,j)$ | 1 | 2 | $\infty$ | $\infty$ | $\infty$ | $\infty$ | $\infty$ |
| $d_{RC2}(i,j)$ | 0 | 0.22 | 0.33 | 0 | 0.33 | 0.5 | 0 |
| $d_{RC3}(i,j)$ | 0 | 0.25 | 0.38 | 0 | 0.35 | 0.52 | 0.09 |
| $d_0(i,j)$ | 0 | 137.74 | 189.28 | 0 | 275.49 | 378.56 | 200 |
| $d_C(i,j)$ | 1 | 3 | 4 | 1 | 3 | 4 | 4 |
| $d_{C2}(i,j)$ | 0 | 0.45 | 0.56 | 0 | 0.67 | 0.83 | 0.50 |

Figure 17

SYSTEM AND METHOD FOR DETECTING AND ANALYZING PATTERN RELATIONSHIPS (This application claims the benefit of PCT Application No. PCT/CA2007/001342 Filed Jul. 30, 2007 in its entirety herein incorporated by reference, which claims the benefit of U.S. Provisional Application No. 60/833,780 Filed Jul. 28, 2006 in its entirety herein incorporated by reference, which claims the benefit of U.S. Provisional Application No. 60/862,087 Filed Oct. 19, 2006 in its entirety herein incorporated by reference.)

FIELD OF THE INVENTION

The present invention relates to data mining and knowledge discovery and more specifically, to a system and method for detecting and analyzing pattern relationships such as defining distances between patterns.

Typically, data mining and knowledge discovery attempt to extract knowledge from a database. However, one of the major challenges in data

BACKGROUND OF THE INVENTION mining and knowledge discovery today is to discover interesting relationships in complex and diverse high dimensional data sets. Interesting information and relevant patterns might be scattered, entangled in and spanning various data subspaces. Currently, there are several problems in the area of data mining and knowledge discovery, some of which are discussed below.

First, there exist some technologies to discover patterns such as patterns from data sets including pattern discovery and association rule mining. Pattern mining aims to discover previously unknown patterns/rules from the raw or pre-processed data. Pattern mining is used in the knowledge discovery process for example for business applications, commercial applications and other uses in support of discovering useful knowledge from data. However, very often, the number of patterns discovered is overwhelming. In fact, the number of discovered patterns is often so large that the patterns cannot be presented to the users as they won't have much meaning.

Currently, to handle problems of having too many patterns, additional specification is obtained from the users to select the more interesting patterns. For example, the system may ask users to specify their existing knowledge and search unexpected patterns for them. Another example is to use templates or constraints to specify the required patterns. Another approach to deal with the problem of too many patterns is to prune uninteresting patterns based on certain criteria. Some common criteria are minimum improvement in confidence or the coverage of the patterns over the entire data set. Some systems group patterns using a nonparametric density estimation method. Others select a subset of associations to form a summary of the discovered associations while the rest of the patterns are grouped into them accordingly. However, all of the attempts in the prior art to deal with this issue have some limitations. For example, these systems may require user input to select desired patterns or be limited to receiving one type of patterns. Another example is that interesting patterns may be pruned by these systems since the measure of interestingness is rather ad hoc.

Thus, post-processing of the discovered patterns is needed to render further analysis. For example, pattern pruning removes uninteresting patterns, and pattern summarization builds a summary of the patterns. A fundamental problem of all post-processing tasks is to describe the relationship among discovered patterns.

One method to analyze the discovered patterns and to understand the meaning of the large number of patterns is to calculate the distance between the patterns existent within the data.

However, existing distancing methods offer limited insight into the patterns, one method to calculate distances between patterns within corresponding data groups is to count the number of common primary events (or items in the terminology of association rule mining) shared by them. For example, in a text mining application, the patterns [computer, science] and [computer, language] share the event [computer] and so their distance is 1. However, this approach may be disadvantageous as sometimes related patterns may not contain common primary events. For instance, the patterns [computer, science] and [programming, language] do not share any common events but programming language is related to and a subject in computer science. Second, this approach may be disadvantageous as unrelated patterns may contain common primary events. For instance, [computer, science] and [social, science] share one primary event. However, computer science and social science are two separate fields. Hence, counting the number of common primary events may miss certain subtle relationships between patterns and may produce misleading and undesirable results.

Other methods to calculate distances between patterns involve distances based on the number of samples in which different patterns either match or mismatch. For example, this may involve counting the number of samples where the patterns share or differ. However, these sample matching distances are one dimensional and only account for either differences or similarities between samples. This may not be sufficient for all types of data clusters.

Accordingly, there is a need for a method and system to discover, and analyze pattern information and corresponding data so as to obviate or mitigate at least some of the above-presented disadvantages.

SUMMARY OF THE INVENTION

According to one aspect, there is provided a method for analyzing relationships among patterns within a data set having a set of samples and corresponding attribute value for each attribute of each said sample, the method comprising: receiving at an input at least two patterns; defining a data cluster within the data set for each of said at least two patterns, each defined data cluster having samples with attribute values associated with a corresponding pattern of said at least two patterns; grouping at least some of the samples of each defined data cluster with one another to generate a resultant data cluster; and calculating a variation between the attribute value of a first set of samples and the attribute value of a second set of samples within said resultant data cluster, the attribute value of the first set of samples and the second set of samples corresponding to the same attribute.

According to another aspect, there is provided a system for analyzing relationships among patterns within a data set having a set of samples and a corresponding attribute value for each attribute of each said sample, the system comprising: a pattern inducing module configured for receiving at an input at least two patterns, and defining a data cluster within the data set for each of said at least two patterns, each defined data cluster having samples with attribute values associated with a corresponding pattern of said at least two patterns; a prototyping module configured for grouping at least some of the samples of each defined data cluster with one another to generate a resultant data cluster; and a distancing module configured for calculating a variation between the attribute value of a first set of samples and the attribute value of a second set of samples within said resultant data cluster, the attribute value of the first set of samples and the second set of samples corresponding to the same attribute.

A computer readable memory having recorded thereon instructions to carry out the method is also provided.

BRIEF DESCRIPTION OF THE DRAWINGS

The invention will be better understood with reference to the attached drawings, in which:

FIGS. 4A, 4B and 4C illustrate an example of combining data clusters shown in FIGS. 3A-3C;

FIG. 17 illustrates a table showing comparisons between various distance measurement techniques;

DETAILED DESCRIPTION

Knowledge Discovery and Analysis System 150

Figure 1:
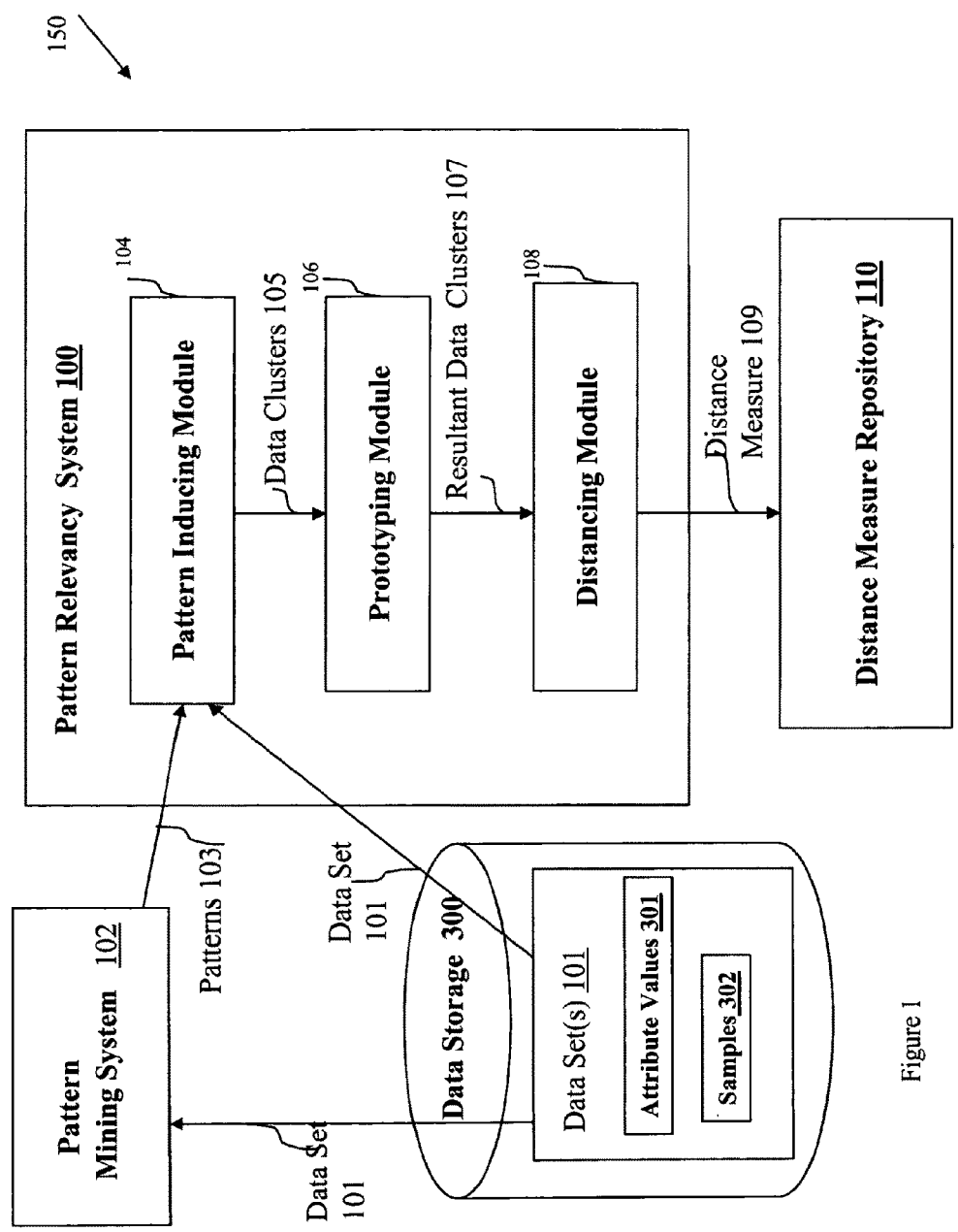
FIG. 1 is a schematic diagram of an embodiment of a knowledge discovery and analysis system illustrating pattern analysis and pattern relevancy system.

For convenience, like reference numerals in the description refer to like structures in the drawings. Referring to FIG. 1, shown is an embodiment of a knowledge discovery and analysis system, indicated generally by the numeral 150. The knowledge discovery and analysis system 150 is configured for extracting knowledge from data including discovering interesting relationships from a data set 101 such as discovering patterns 103 and detecting and analyzing relationships between the patterns 103. As will be described, the pattern analysis provided by the knowledge discovery and analysis system 150 allows interpretation of the patterns 103 found relating to the data set 101 such as to use the patterns 103 for further analysis of the data set 101.

The data set 101 includes a set of samples 302 and a set of attribute values 303 relating to the samples 302 such that each sample 302 has a value for a corresponding attribute 303. The data set 101 can include data samples 302 relating to, for example, financial, health, education, geographical and other types of data where it is desirable to detect and analyze patterns within the data as will be understood by a person of ordinary skill in the art. The knowledge discovery system 150 comprises a data storage 300 for storing the one or more data sets 101 and the corresponding set of samples 302 and attribute values 301 (corresponding to attributes 303) relating to the samples 302.

Data Storage 300

Figures 3A, 3B:
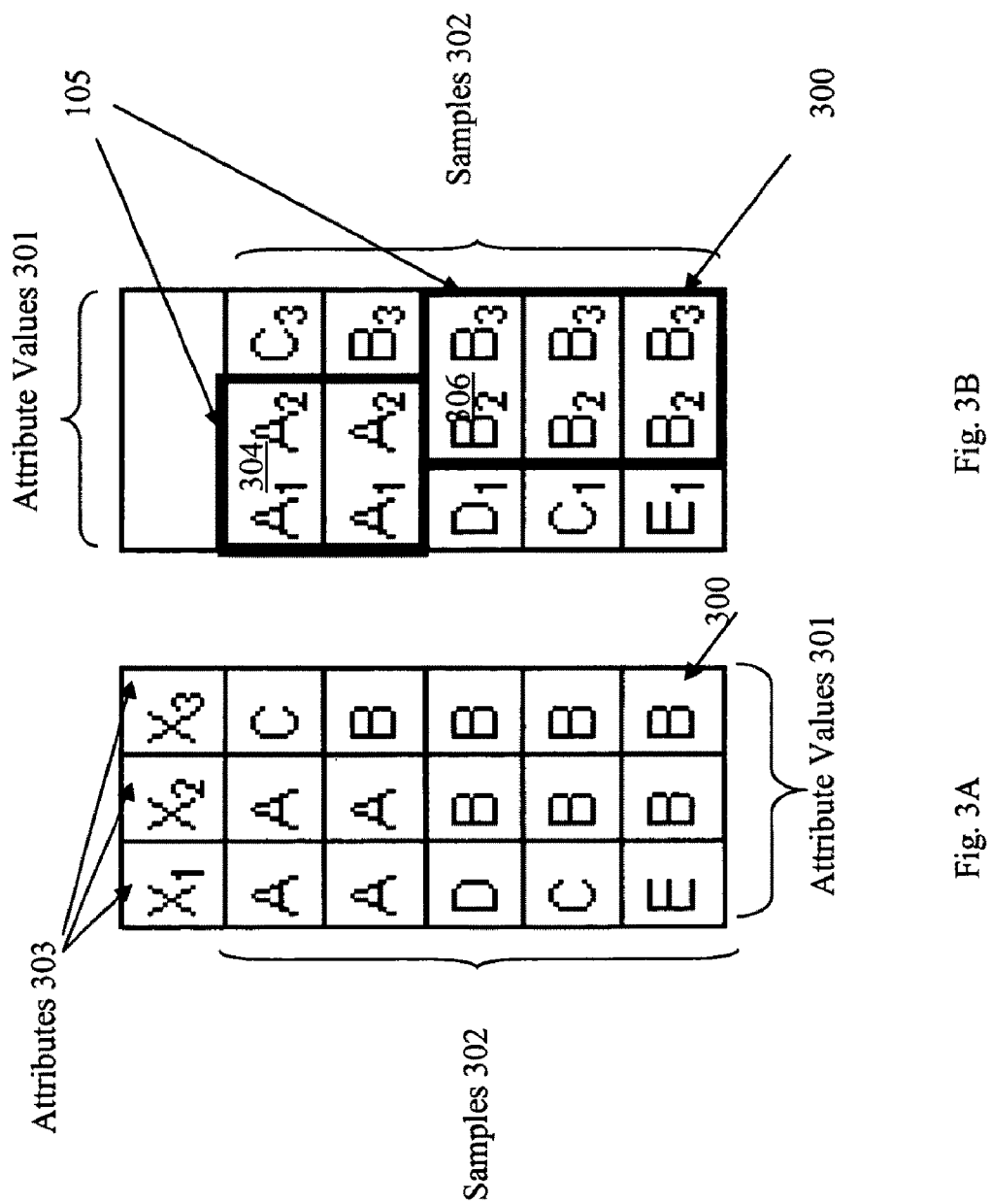
FIGS. 3A, 3B and 3C illustrate an example of a relational database and corresponding data clusters based on corresponding patterns.

Referring again to FIG. 1, the data set 101 contains samples 302 and attribute values 301 for attributes 303 stored within the data storage 300. For illustrative purposes, a relational database or storage 300 is shown in FIG. 3A. Generally, each storage 300 can be represented by a table such as that shown in FIG. 3A and each data set 101 is represented by its corresponding set of samples 302 and attribute values 301 for attributes 303 which can represent various patterns/rules 103. As illustrated in FIG. 3A, each attribute value 301 represents a value or symbol or other quantifier for a corresponding attribute 303 (e.g. shown as attributes X1, X2, and X3). Similarly, in the example shown in FIG. 3C, the sample 302 include different types of animals and the attribute values 301 provide a value that define the characteristics of each of the samples 302. That is, each animal sample 302 has an attribute value 301 (e.g. true/false) for each attribute 303 (e.g. animal characteristics such as lay eggs or feathers).

As will be understood by a person of ordinary skill in the art, since the permutation of samples 302 and attribute values 301 in the storage 300 do not affect the calculation of any pattern/rule detection methods and the distance measures 109 of the patterns 103, the permuted storage 300 is considered to be equivalent to the original storage 300. Hence, without loss of generality, after proper permutation of the samples 302 and the attribute values 301, a subset of samples 302 and a subset of attributes 301 can form a "continual" block in the storage 300. Thus it is always possible to represent the set of samples 302 and attribute values 301 containing the patterns 103 by a continual block after the proper permutation. As will be described, the permutation of samples 302 and attribute values 301 containing the patterns 103 (corresponding to each defined data cluster 105) is performed to form a continual block of samples 302 having patterns 103 (corresponding to a resultant data cluster 107). As will be described, a database, a memory and other storage mediums for use in storing, accessing, viewing and manipulating data are exemplary embodiments of the storage 300.

It will be understood by a person skilled in the art that the storage/database 300 described herein is the place where data is held in an electromagnetic or optical form for access by a computer processor. There are two general usages: First, storage is frequently used to mean the devices and data connected to the computer through input/output operations such as hard disk and tape systems and other forms of storage not including computer memory and other in-computer storage. Second, in a more formal usage, storage has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage is much faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of the data storage 300 as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Computer databases typically contain aggregations of data records or files, such as sales transactions, product catalogs and inventories, and customer profiles.

Memory is a further embodiment of storage/database 300 as the electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor.

The knowledge discovery and analysis system 150 further comprises a pattern mining module 102 for performing pattern detection based on the received data set 101.

Pattern Mining Module 102

As discussed earlier, the pattern mining module 102 is adapted to discover interesting relationships hidden in data sets 101. That is, the pattern mining module 102 extracts previously unknown patterns/rules 103 from the data set 101.

For example, the pattern mining module 102 may include a pattern discovery module, a correlation rule mining module, a frequent itemset mining module and/or an association rule mining module. Further, the pattern mining module 102 may include a library of predefined patterns 103 as related to different data set 101 types.

The association rule mining module is a data mining technology that extracts frequent itemsets and then generates strong association rules from data sets 101. The correlation rule mining module is another data mining technology that extracts correlated itemsets, also known as correlation rules. Preferably, the patterns 103 generated by the pattern discovery module, the correlation rule mining module, the frequent itemset mining module and the association rule mining module include event association patterns, correlation rules, frequent itemsets and association rules respectively. For example, each event association pattern (i.e., generated by the pattern discovery module) is a conjunction of feature-values pairs that are likely or unlikely to co-occur in the data.

In addition, each of the frequent itemsets generated by the association rule mining module is also a conjunction of feature-value pairs. Likewise, each of the correlation rules generated by correlation rule mining is also a conjunction of feature-value pairs. The difference between event association patterns, frequent itemsets, association rules and correlation rules are the statistical and probabilistic justification and the searching algorithms that they are based on. Frequent itemsets can be further categorized as all frequent itemsets, closed frequent itemsets, or maximal frequent itemsets. The term "frequent itemsets", as used herein, refers to such three types of itemsets. The term "patterns" refers to event association patterns, frequent itemsets, association rules and correlation rules.

It will be noted that other types pattern discovery techniques may be used by the pattern mining module 102 such as to generate for example one or more of the following patterns/rules 103: positive event association patterns, frequent itemsets, association rules, correlation rules and other types of patterns as will be understood by a person of ordinary skill in the art.

Thus, the pattern mining module 102 receives the data set 101 from the data storage 300 and provides one or more patterns 103 to a pattern relevancy system 100 coupled thereto.

Pattern Relevancy System 100

The pattern relevancy system 100 further comprises the following components: a pattern inducing module 104 for defining a subset of the data (also referred to as data clusters 105) relating to the patterns 103, a prototyping module 106 for defining an area relating to combined data clusters 107 for use in calculating distance between the patterns 103, and a distancing module 108 for calculating the distance between the patterns as present in the data clusters 105.

As will be described with reference to each of the modules 104, 106, and 108, the pattern relevancy system 100 receives patterns 103 related to the received data set 101 and forms data clusters 105 representing the discovered patterns 103 and the underlying data set 101. The pattern relevancy system 100 then defines an area related to the formed data clusters 105 represented as a resultant data cluster 107 and measures distances between the patterns 103 based upon the resultant data cluster 107. Once the distance 109 between the various patterns 103 is found, the relevance of each of the patterns 103 within the data set 101 can be determined based on the distance measured 109. That is, the distance measurement measures the distance 109 between patterns 103. This distance 109 can be used for various pattern post-processing tasks: pattern clustering, pattern pruning, pattern summarization, pattern visualization and pattern classification.

Distance Measure Repository 110

Referring again to FIG. 1, the knowledge discovery and analysis system 150 further comprises a distance measure repository 110 in communication with the pattern relevancy system 100. According to one embodiment, once the distance measure 109 is calculated by the pattern relevancy system 100, it is stored within the distance measure repository 110 for subsequent access. That is, the distance measurement 109 that is stored can be used to group similar patterns for clustering; identify typical patterns for summarization; identify outlier patterns for pruning; distinguish different types of patterns for pattern classification and select relevant patterns for visualization. In one example, existing clustering algorithms use the distance measure 109 stored within the distance measure repository 110 to cluster the patterns 103 and their associated data 101. In another example, certain patterns 103 may be pruned depending on the distance measure 109 stored.

Computing Device 101

Figure 2:
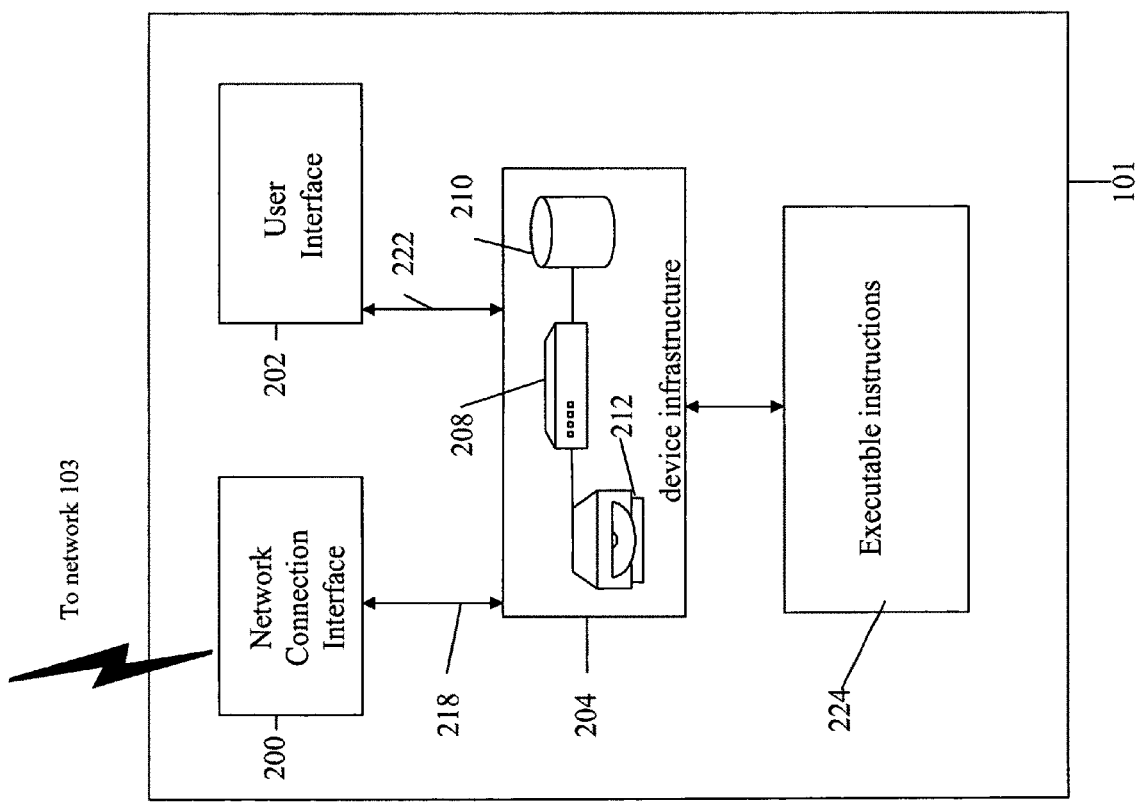
FIG. 2 is a schematic diagram illustrating an exemplary computing device for the pattern relevancy system of FIG. 1.

The pattern relevancy system 100, the pattern mining system 102, the data storage 300 and the distance measure repository 110 described herein may be implemented on one or more networked computing devices 101 such as that illustrated in FIG. 2. Referring to FIG. 2, the computing device 101 can include a network connection interface 200, such as a network interface card or a modem, coupled via connection 218 to a device infrastructure 204. The connection interface 200 is connectable during operation of the device 101 to the network 103 (e.g. an Intranet and/or an extranet such as the Internet), which enables the devices 101 to communicate with each other (e.g. that of the pattern relevancy system 100, and the pattern mining system 102) as appropriate. The network 103 can support the communication of the messages for the various transmitted data (e.g. data set 101, patterns 103, etc.) as desired.

Referring again to FIG. 2, the device 101 can also have a user interface 202, coupled to the device infrastructure 204 by connection 222, to interact with a user (e.g. system 150 administrator, or system 100 administrator etc.). The user interface 202 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 204. For example, the user interface 202 for the pattern relevancy system 100 and/or the pattern mining system 102 is employed by a user to define or modify the data set 101, define or modify the patterns provided by the pattern mining system 102, or select the type of prototyping (e.g. union or intersection), or select the type of distancing (e.g. entropy based distancing) as desired.

Referring again to FIG. 2, operation of the device 101 is facilitated by the device infrastructure 204. The device infrastructure 204 includes one or more computer processors 208 and can include an associated memory 210 (e.g. a random access memory). The memory 210 is used to store data (e.g. data set 101, patterns 103) for access by the respective user and/or operating system/ executable instructions 224 of the device 101. The computer processor 208 facilitates performance of the device 101 configured for the intended task through operation of the network interface 200, the user interface 202 and other application programs/hardware 224 (e.g. browser or other device application on the mobile/desktop) of the device 101 by executing task related instructions. These task related instructions can be provided by an operating system, and/or software applications 224 located in the memory 210, and/or by operability that is configured into the electronic/digital circuitry of the processor(s) 208 designed to perform the specific task(s). Further, it is recognized that the device infrastructure 204 can include a computer readable storage medium 212 coupled to the processor 208 for providing instructions to the processor 208 and/or to load/update the instructions 224. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid-state memory card, or RAM provided in the memory module 210. It should be noted that the above listed example computer readable mediums 212 can be used either alone or in combination.

Further, it is recognized that the computing device 101 can include the executable applications 224 comprising code or machine readable instructions for implementing predetermined functions/operations including those of an operating system and the system 100 or modules 104, 106 and 108, for example. The processor 208 as used herein is a configured device and/or set of machine-readable instructions for performing operations as described by example above.

As used herein, the processor 208 may comprise any one or combination of, hardware, firmware, and/or software. The processor 208 acts upon information by manipulating, analyzing, modifying, converting or transmitting information for use by an executable procedure or an information device, and/or by routing the information with respect to an output device. The processor 208 may use or comprise the capabilities of a controller or microprocessor, for example. Accordingly, any of the functionality of the executable instructions 227 (e.g. through modules associated with selected tasks) may be implemented in hardware, software or a combination of both. Accordingly, the use of a processor 208 as a device and/or as a set of machine-readable instructions is hereafter referred to generically as a processor/module for sake of simplicity. The memory 222 is used to store data locally as well as to facilitate access to remote data stored on other devices 101 connected to the network 103.

Each of the main components of the pattern relevancy system 100 will now be described with reference to FIGS. 1-5, namely, the pattern inducing module 104, the prototyping module 106 and the distancing module 108.

Pattern Relevancy System 100

The pattern relevancy system 100 further comprises the following components: a pattern inducing module 104 for defining a subset of the data (also referred to as data clusters 105) relating to the patterns 103, a prototyping module 106 for defining an area relating to combined data clusters 107 for use in calculating distance between the patterns 103, and a distancing module 108 for calculating the distance between the patterns 103 as present in the data clusters 105.

As will be described with reference to each of the modules 104, 106, and 108, the pattern relevancy system 100 receives patterns 103 related to the received data set 101 and forms data clusters 105 representing the discovered patterns 103 in the underlying data set 101. The pattern relevancy system 100 then defines an area (selected section/grouping of the attribute values 303 in the database 300) related to the formed data clusters 105 represented as a resultant data cluster 107 and measures distances between the patterns 103 based upon the resultant data cluster 107. Once the distance 109 between the various patterns 103 is found, the relevance of each of the patterns 103 within the data set 101 can be determined based on the distance measured 109. That is, the distance measurement identifies outliers among patterns and provides a threshold for pattern pruning. Further, the distance measurement can be used to group similar patterns for clustering; identify typical patterns for summarization and select relevant patterns for visualization. For example, once a distance measure 109 is defined, it may be stored within the distance measure repository 110 such that existing clustering algorithms can be used to cluster the patterns 103 and their associated data 101. In another example, certain patterns 103 may be pruned depending on the distance measure 109 detected.

Pattern Inducing Module 104

According to one embodiment, the pattern mining module 102 produces a set of patterns 103 (e.g. identified as x1-xn) to the pattern inducing module 104. That is, the pattern inducing module 104 compares the values of the attributes 303 of each of the patterns 103 to the related sets of attribute values 301 (for corresponding attributes) in the data set to identify the data clusters 105 by those sets of attribute values 301 that match the patterns 103. In broad terms, the pattern inducing module 104 provides the data cluster 105 having the minimal subset of data that contains the patterns 103 provided by the pattern mining module 102. This minimal subset of data is referred to as a pattern induced data cluster or simply as a data cluster 105.

Thus, where the pattern inducing module 104 receives at least two association patterns 103 from the pattern mining system 102, then the pattern inducing module 104 compares said at least two association patterns to the attribute values within the data set to identify the patterns 103 within the data set. That is, the pattern inducing module 104 defines a data cluster 105 within the data set for each of said at least two patterns such that each defined data cluster includes samples with attribute values associated with attributes values of a corresponding pattern of said at least two patterns.

In other words, each data cluster 105 is a set of compound events or samples that contain the patterns x1-xn. As will be described, data clusters 105 may also refer to a subset of data that belong to the union of two or more patterns 103.

Since patterns 103 embody statistical event associations inherent in the data set 101, patterns 103 are related to clustering. In order to define the relationship between patterns 103 existent within the data set 101, the data cluster 105 is induced by each pattern 103 as shown in FIGS. 3A-3C.

For illustrative purposes, a relational database or storage 300 is shown in FIG. 3A. As described earlier, each storage 300 can be represented by a table such as that shown in FIG. 3A and each data set 101 is represented by its corresponding set of samples 302 and attribute values 301 which can represent various patterns/rules 103. Further, the permutation of samples 302 and attribute values 301 in the storage 300 do not affect the calculation of any pattern/rule detection methods and the distance measures 109 of the patterns 103, the permutated storage 300 is considered to be equivalent to the original storage 300.

Referring now to FIG. 3A, it discloses a total of five data samples 302, each of which is described by three attributes 303 identified as $X_1$, $X_2$ and $X_3$. FIG. 3B offers a simplified view of the relational storage 300 schematically illustrated in FIG. 3A and showing pattern induced data clusters 105 (e.g. 304, 306). For example, the data cluster 304 is the induced data set of frequent itemsets $A_1A_2$ (an exemplary type of patterns 103). As described each data cluster 105 is a data subspace induced by a specific pattern 103 in the entire storage 300 (see FIG. 1). Thus, the two rectangles in FIG. 3B which are outlined and identified as 304 and 306 are the data clusters 105 of patterns $A_1A_2$ and $B_2B_3$ respectively. Essentially, a data cluster 105 consists of a set of samples 302 and their attribute values 301. For example, the data cluster 304 which is induced by $A_1A_2$ consists of the first two samples 302 and the first two attributes 303 (identified as $X_1$ and $X_2$) and the data cluster 306 induced by $B_2B_3$ consists of the last three samples 302 and the last two attributes 303 (identified as $X_2$ and $X_3$). In the event where the data cluster 105 do not form a continual block, the samples 302 and attribute values 301 may be permutated such that the data cluster 105 are located next to one another such that they can be used to form the resultant data cluster 107.

Figure 3C:
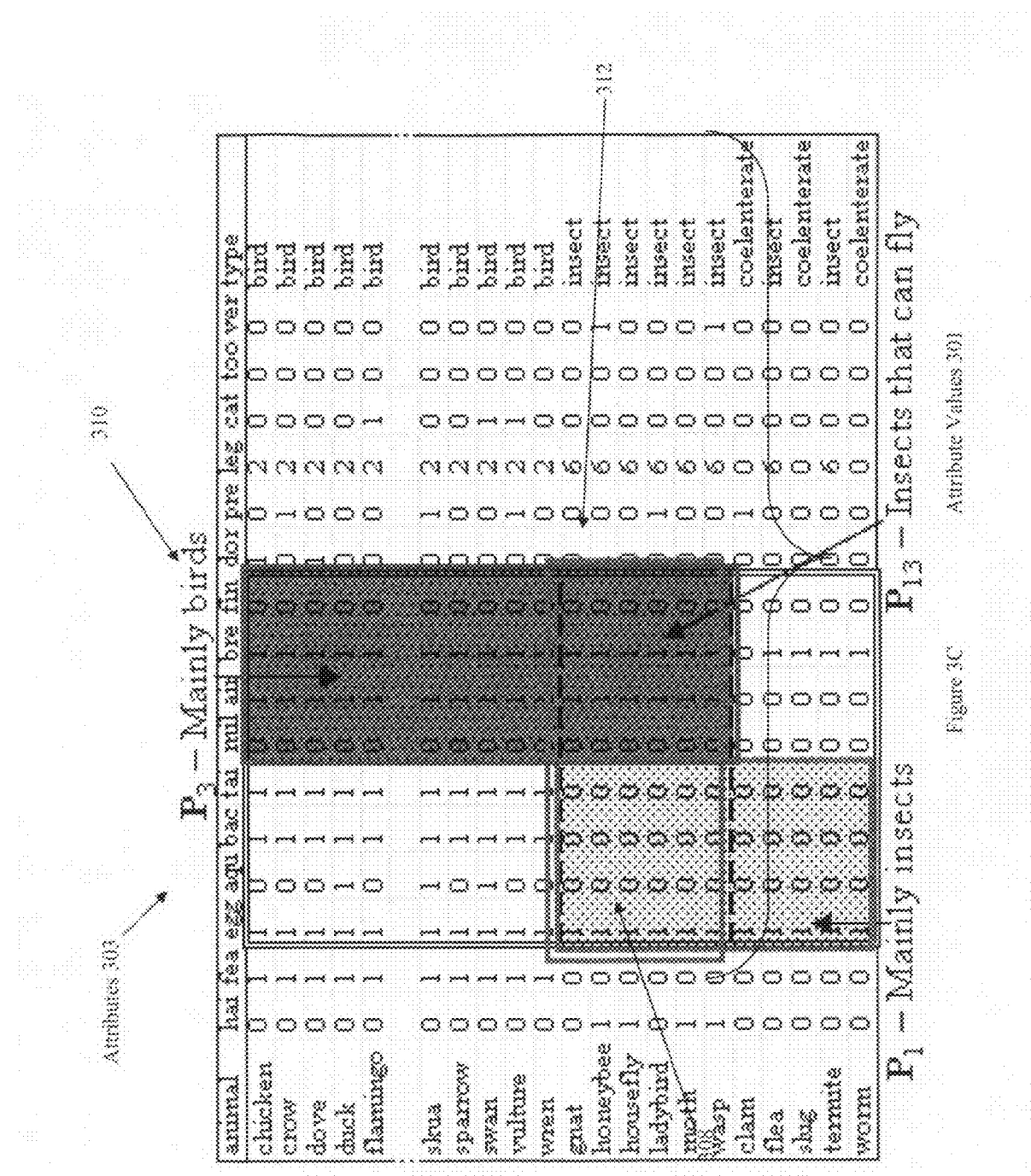

Referring now to FIG. 3C, shown is another example of pattern induced data clusters 105 (e.g. data clusters 308, 310, 312) provided by the pattern inducing module 104. In this case, a storage 300 is shown consisting of samples 302 relating to various animals and attribute values 301 relating to characteristics of the animals. Thus, data cluster 308 includes a set of data that is a subset of the data set 101 and includes a set of attributes 303 and samples 302. Specifically, data cluster 308 includes attributes 303 including eggs, aquatic, backbone and tail. Data cluster 308 also includes animal samples 302 including gnat, honeybee, housefly, ladybird, moth, wasp, clam, flea, slug, termite, and worm which is a subset of the samples within storage 300. Data cluster 308 is induced by a pattern 103 [eggs=1, aquatic=0, backbone=0, tail=0]. Data cluster 310 includes attributes 303 milk, airborne, breathes, fins and samples 302 including chicken, crow, dove, duck, flamingo, skua, sparrow, swan, vulture, wren, gnat, honeybee, housefly, ladybird, moth, and wasp. Further, data cluster 310 is induced by the pattern 103 [milk=0, airborne=1, breathes=1, fins=0] and data cluster 312 is the data cluster induced by [eggs=1, aquatic=0, backbone=0, tail=0, milk=0, airborne=1, breathes=1, fins=0].

Prototyping Module 106

Referring again to FIG. 1, once the data clusters 105 are obtained from the pattern inducing module 104, the pattern relevancy system 100 is configured to calculate distances between the data clusters 105 and their associated patterns 103. Prior to this, the prototyping module 106 is adapted to provide a definition of an area of data (related section/grouping of the attribute values) within the storage 300 for use by the distancing module 108 in calculating the distances between the data clusters 105. This area defined by the prototyping module (and represented as a resultant data cluster 107—FIG. 6) is a result of mathematical operations on the data clusters 105. The mathematical operations can include for example, union of two or more data clusters 105; intersection of two or more data clusters 105; difference of two or more data clusters 105; weighted combination of data clusters 105 (also referred to as m-prototypes). That is, the prototyping module 106 groups at least some of the samples 302 of each induced data cluster 105 with one another to define a resultant data cluster 107.

Figure 6:
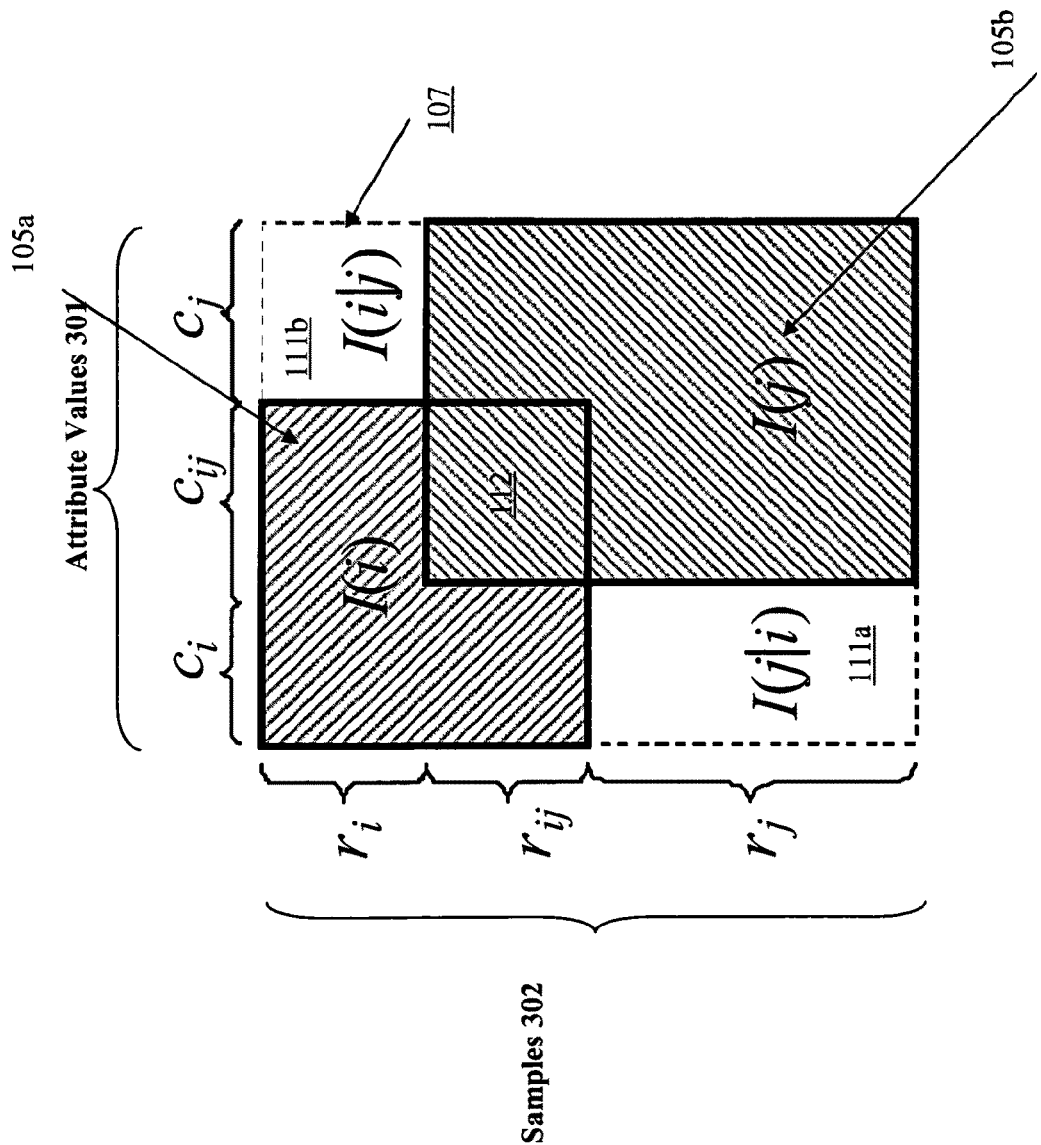
FIG. 6 illustrate exemplary data clusters for calculating distance measure according to the distancing module of FIG. 5.
Figure 18B:
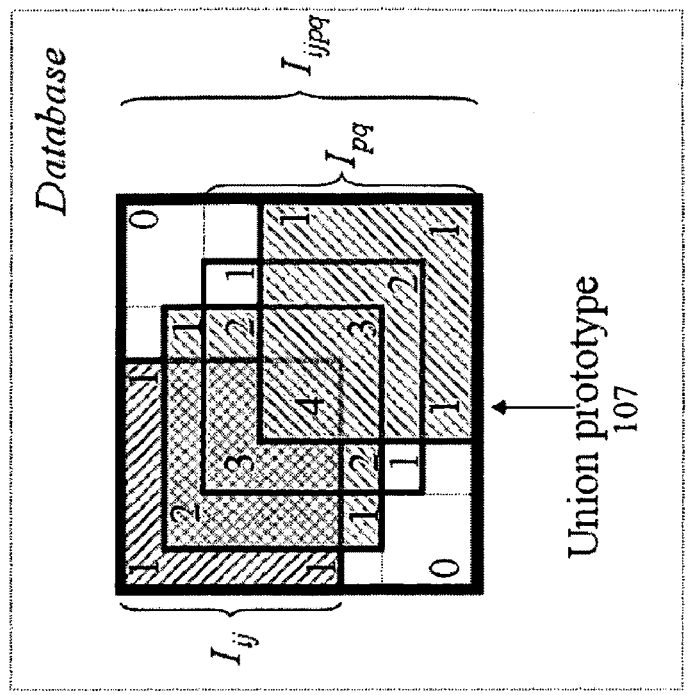
FIGS. 18a-18d are schematic block diagrams illustrating various prototyping methods.
Figure 18A:
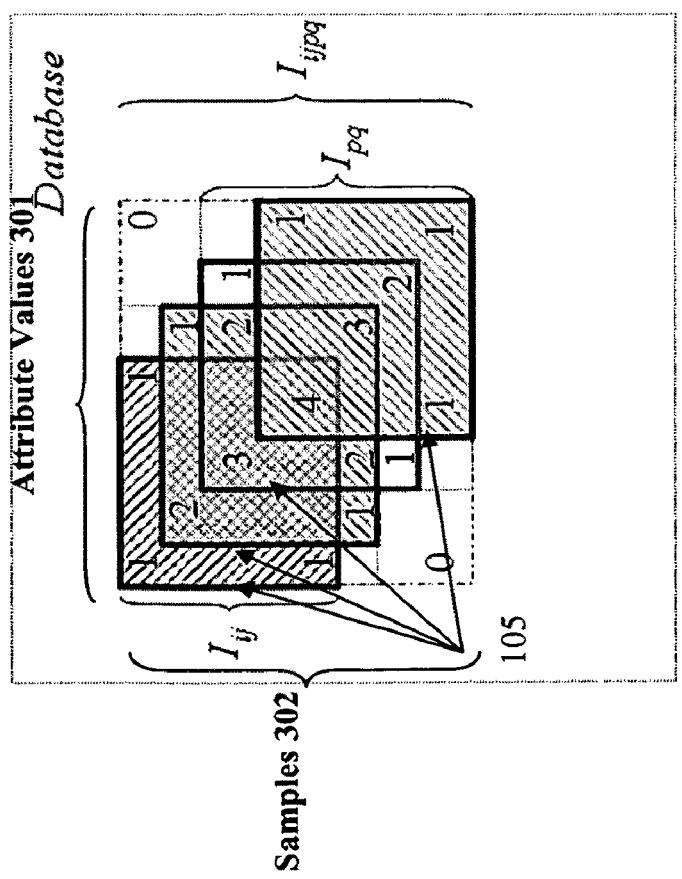
Figure 18D:
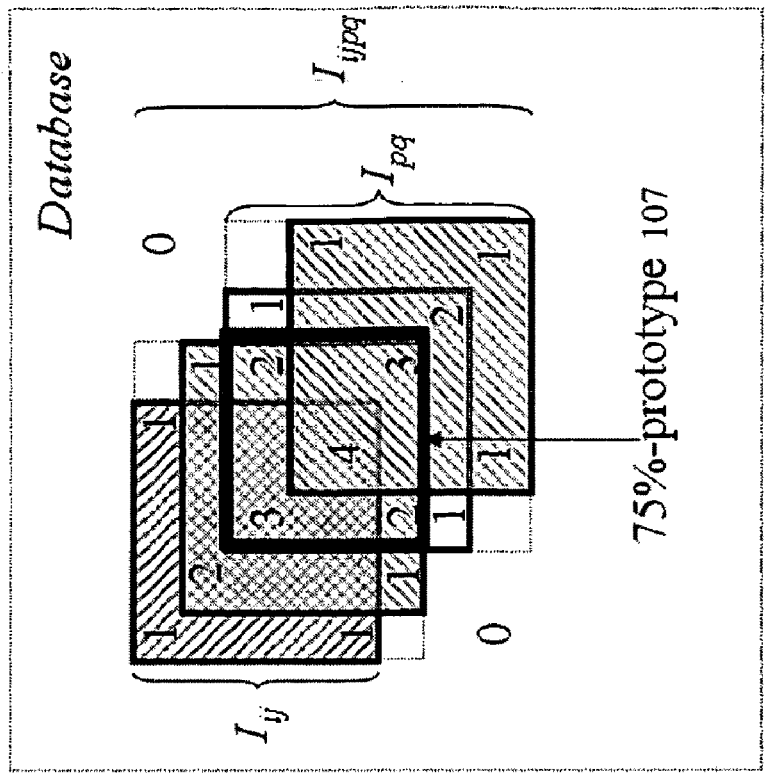
Figure 18C:
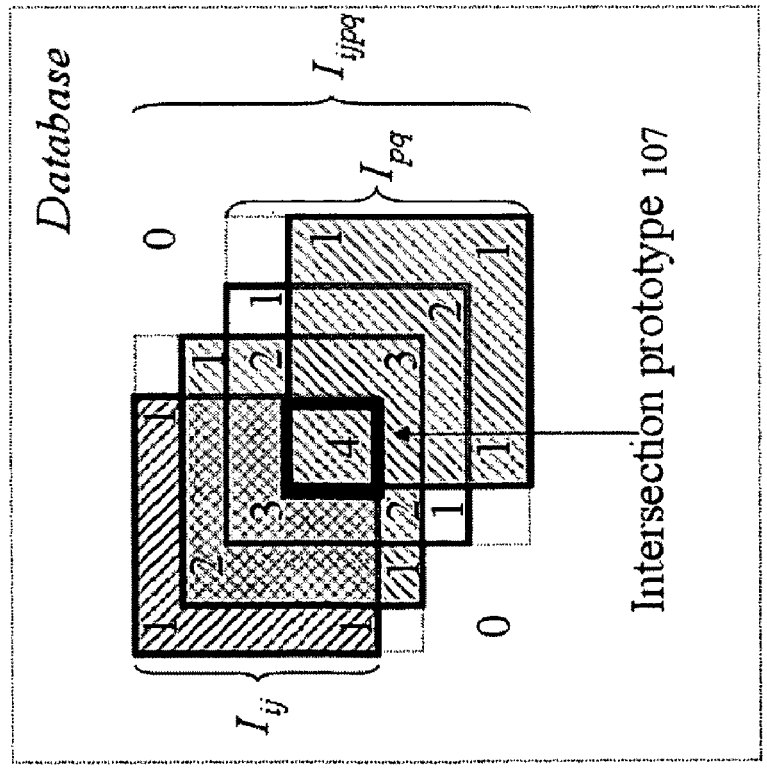

According to one embodiment, intersection prototyping as illustrated in FIG. 18c, detects the overlapping data portion shared between two or more data clusters 105 to define the resultant data cluster 107. Thus the generated resultant data cluster 107 includes common samples 302 having same attribute values 301 for same attributes 303 associated with each one of the data clusters 105. An example overlapping data portion 112 is shown in FIG. 6 and discussed later.

According to an alternate embodiment, union prototyping as provided by the prototyping module 106 merges individual data clusters 105 such as to provide a resultant data cluster 107 that is the union of their corresponding samples 302, attributes 303 and all attribute values 301. In this way, the resultant data cluster 107 is a data set that contains all of the samples 302 and attribute values 301 (corresponding to attributes 303) defined by the underlying data clusters 105. That is, the resultant data cluster 107 includes all the samples 302 included in each data cluster 105 and each of the samples 302 of the resultant data cluster 107 has attribute values 301 for each one of the attributes 303 of each of the data clusters 105. Considering a scenario where there exists a first and a second data cluster 105 having a corresponding first set of samples 302, attribute values 301 defining attributes 303 and a second set of samples 302, attribute values 301 defining attributes 303 then the resultant data cluster 107 includes a resultant set of samples 302 (combination of the first and second set of samples 302) each resultant sample 302 having attribute values 301 for the first and second attributes 303. As will be described, in this way, the resultant data cluster 107 may include corner regions having attribute values that were not induced by any one of the patterns 103.

Figures 4A, 4B:
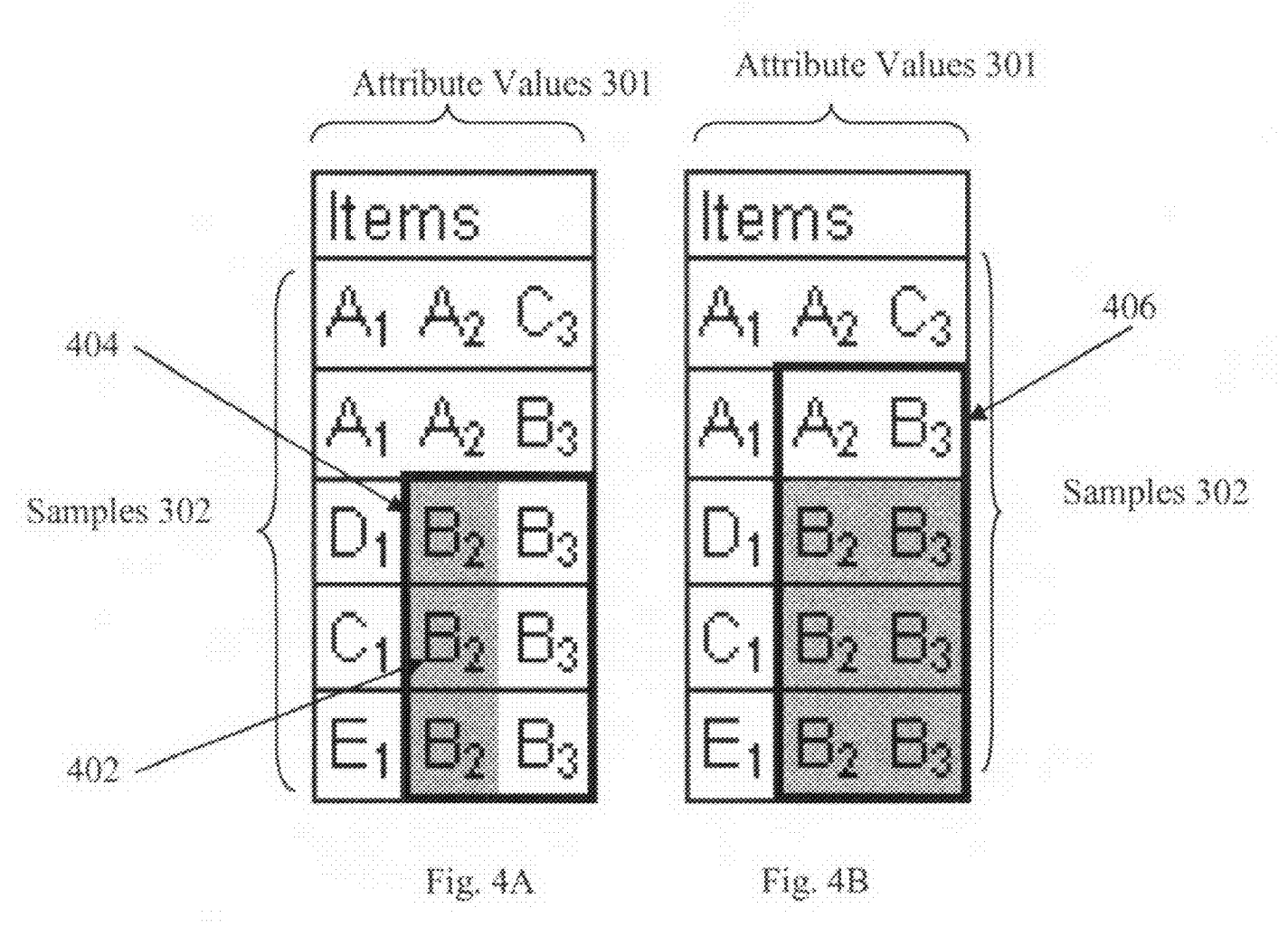

For example, FIGS. 1 and 4A show how the pattern induced data clusters 105 of patterns 103 (e.g. frequent itemsets) $B_2$ (identified as data cluster 402) and $B_2B_3$ (identified as data cluster 404) are merged. The merged data set (or the resultant data cluster 107) is the same as the data cluster induced by pattern $B_2B_3$ and identified as 404. In FIG. 4B, the resultant data cluster of $B_2$ and $B_2B_3$ (shown as 404) is further merged with the data cluster of $B_3$ to create a merged data cluster 406.

It is noted that merging different data clusters 105 may introduce noise. In the example of FIG. 4B, the event $A_2$ at the left top corner of the highlighted rectangle is noise to the resultant data cluster 406.

Similarly, referring to FIG. 6, shown are two pattern induced data clusters I(i) 105a and I(j) 105b. When the two pattern 103 induced data clusters 105a, 105b are merged to form a resultant data cluster 107, the compound events in the top-right and bottom-left corner regions are added into the merged data cluster 107. The corner regions are indicated respectively by I(i|j) and I(j|i) (and indicated as corner regions 111a, 111b). As shown in FIG. 6, corner regions 111a-111b generally refer to attribute values 301 for samples 302 included in the resultant data cluster (e.g. 107) such that the corner region data is not induced by any of the patterns 103 that induced the data clusters (105a, 105b) that were combined. That is, the corner region data includes attribute values 301 within the samples 302 that are not part of the attributes 303 captured by the patterns 103 for the data cluster 105. Accordingly, the resultant data cluster 107 can contain attribute values within the data clusters 105 and outside the data cluster 107 in the corner regions 111a, 111b, for example.

Further, in the example shown in FIG. 6, the resultant data cluster 107 includes an overlapping portion 112 where the attribute values 301 (corresponding to the same attribute 303) and samples 302 are common between two or more data clusters 105 (e.g. 105a, 105b). It is noted that not all resultant data clusters 107 may include an overlapping portion 112. For example, in the cases shown in FIGS. 7a-8b, there is no overlapping portion 112 since no common attribute values 301 (for corresponding attributes 303) are shared between same samples 302 of the two data clusters (e.g. 105).

Figure 4C:
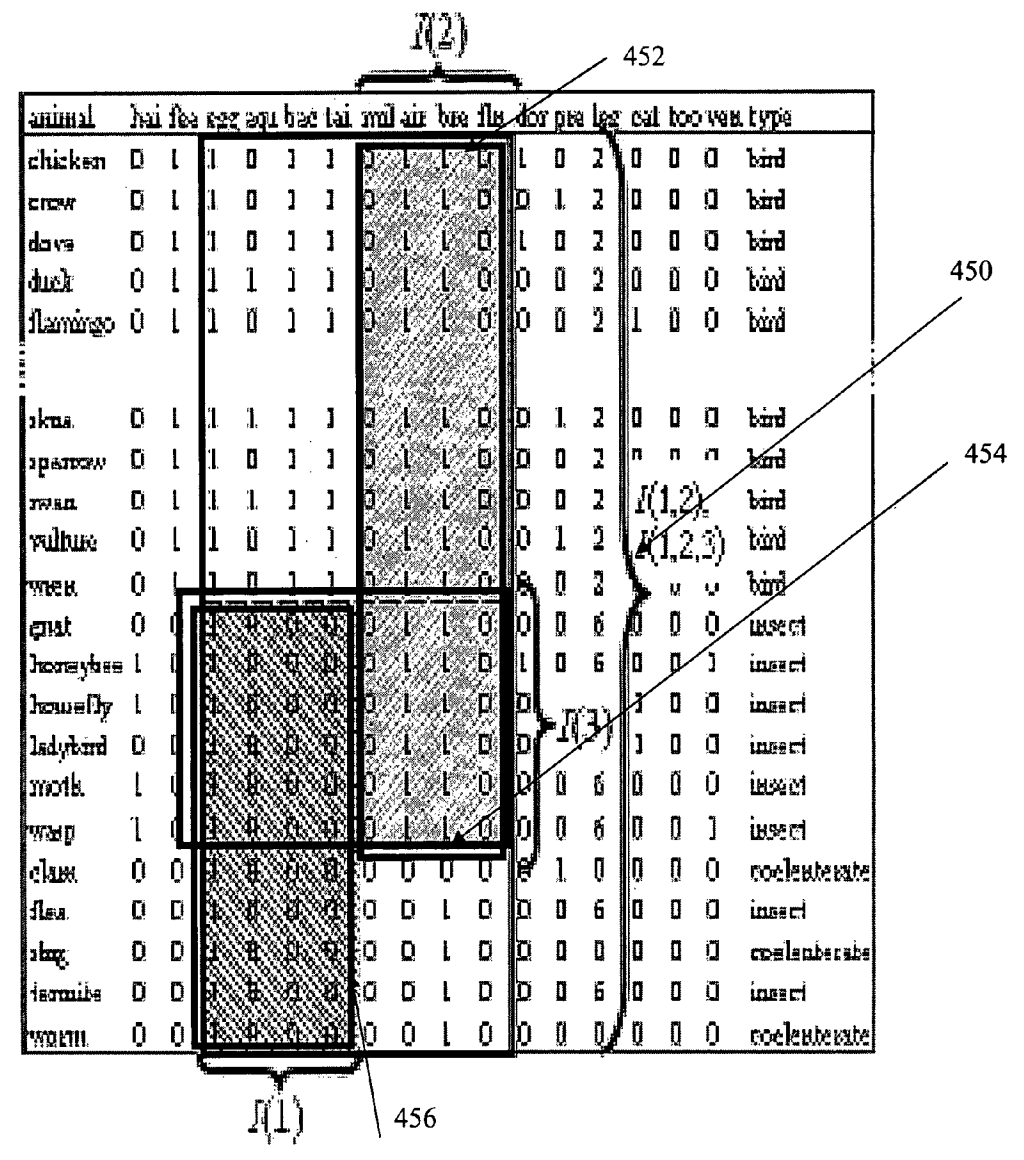

For instance, referring to FIGS. 1 and 4C, the highlighted block 450 denoting a resultant data cluster 107, is merged from data cluster 456 and 452. Similarly the resultant data cluster 450 would be obtained when merging the three data clusters 452, 454, and 456. Other exemplary prototyping methods will now be discussed in reference to FIGS. 18a-18d.

As discussed earlier, the prototyping module 106 is configured to group data clusters 105 and their associated patterns 103 together to form a resultant data cluster 107. That is, as shown in reference to FIGS. 18a-18d, the prototyping module 106 groups at least some of the samples 302 of each induced data cluster 105 with at least some of the samples 302 of one or more other induced data clusters 105 to define a resultant data cluster 107 (e.g. a combination of two or more induced data clusters 105). In each of the FIGS. 18a-18d, the resultant data cluster $I_{ijpq}$ 107 is merged from induced data clusters merging from $I_{ij}$ and $I_{pq}$ 105.

For example, referring to FIG. 18a shown is the induced data clusters 105 that result from the pattern inducing module 104. Referring to FIG. 18b, shown is a union type prototyping performed by the prototyping module 106. In this case, the union of data clusters $I_{ij}$ 105 and $I_{pq}$ 105 is represented as resultant data cluster $I_{ijpq}$ 107. Referring to FIG. 18b, the union of data clusters $I_{ij}$ 105 and $I_{pq}$ is performed by the prototyping module 106 to represent resultant data cluster $I_{ijpq}$ (i.e. the highlighted rectangle) 107. Referring to FIG. 18c, the intersection of data clusters is shown (i.e. the highlighted rectangle) 107. Referring to FIG. 18d, m-prototyping is shown. Here, a percentage of the total number of patterns 103 is taken to define the resultant data cluster (i.e. the highlighted rectangle) 107. For example, with 75%, 4×75%=3: If there are 8 patterns, 8×75%=6. Hence, while the percentage is fixed, the required minimum weights will change as there are more patterns 103 in the pattern clusters 105.

Distancing Module 108

Referring again to FIG. 1, once the resultant data cluster 107 is formed through prototyping operations such as the union of the data clusters 105, the distancing module 108 is configured to calculate the distance between the data clusters 105 induced by different patterns 103.

It is noted that when referring to measuring distances between data clusters 105, in effect this measures the distance between the patterns 103 that induced the data clusters 105 but having regard to the data within the data clusters 105 as well. Thus, the terms measuring distance between the patterns 103 that induced the data clusters 105 and measuring distance between the data clusters 105 are used interchangeably herein.

Thus, the distancing module 108 calculates the distance/variation between the attribute values 301 of a first set of samples 302 and the attribute values 301 of a second set of samples 302 within said resultant data cluster 107 such that the attribute values 301 of the first set of samples 302 that are compared to the attribute values 301 of the second set of samples 302 correspond to the same attribute 303. Thus, the attribute values 301 of different samples 302 contained within the resultant data cluster 107 are compared to one another to determine the degree of variation of the attribute values 301 for different samples 302.

Distancing Module 108

Figure 5:
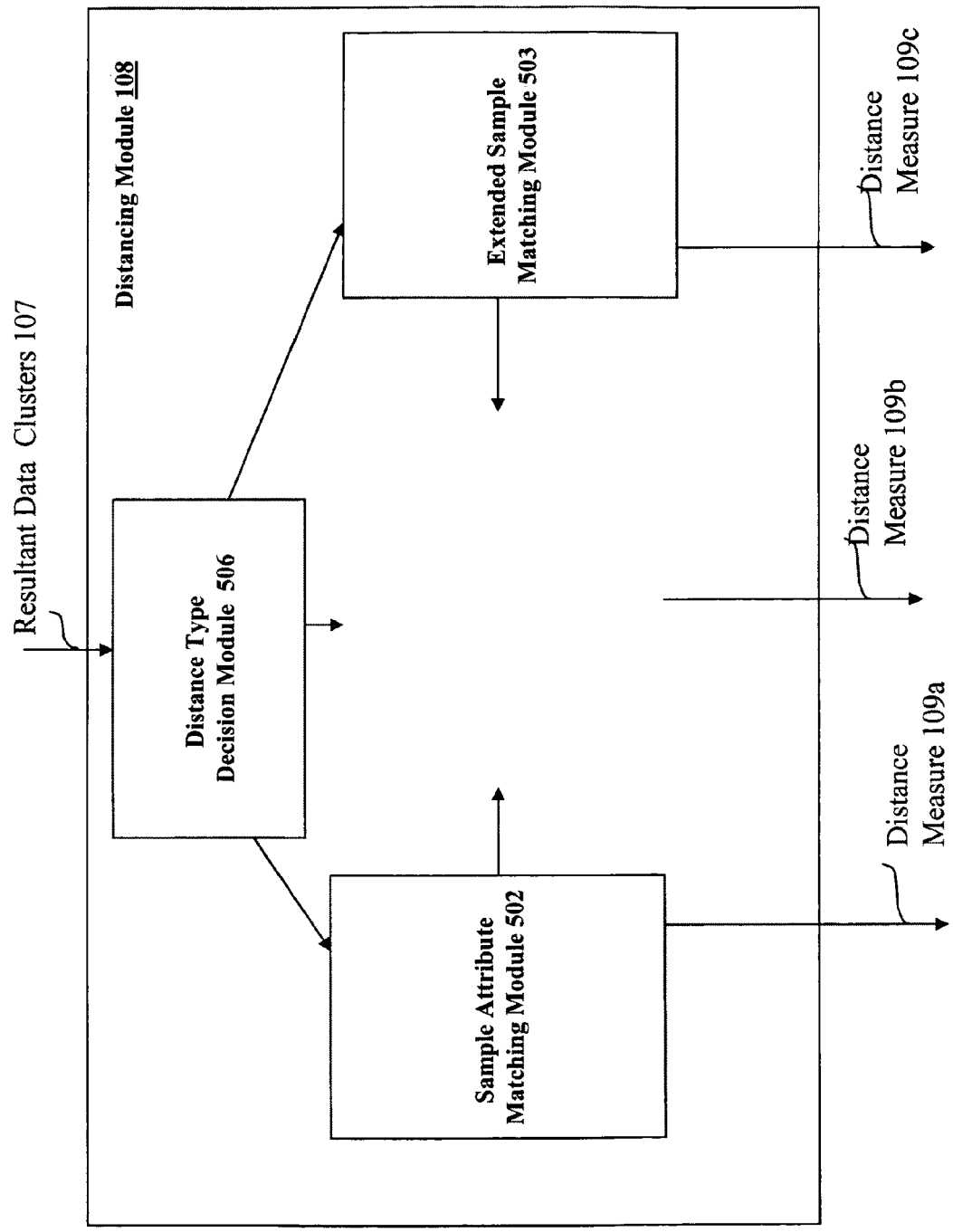
FIG. 5 is a schematic diagram of an embodiment of the distancing module of FIG. 1.

Referring to the embodiment illustrated in FIG. 5, the distancing module 108 comprises a distance type decision module 506, a sample attribute matching module 502 for calculating a distance 109a between patterns 103 based on the samples 302 and attribute values 301; an entropy based distance module 504 for providing a second distance measure 109b based upon variation between clusters 105; and an extended sample matching module 503 for providing a third distance measure 109c based upon the similarities or differences between two patterns 103. It is noted that distances 109a, 109b and 109c as provided by the sample attribute matching module 502, the entropy based distance module 504, and the extended sample matching module 503 respectively may also be referred generally to as distance measure 109.

The decision type distancing module 506 may allow either user interaction or a predetermined setting to define the preferred type of distance measurement desired (e.g. entropy based distance; sample matching based distance; sample attribute based distance).

Extended Sample Matching Module 503

Referring to FIG. 6, the extended sample matching module 503 is adapted to capture both the similar samples and the dissimilar samples between two patterns/rules 103 within pattern induced data clusters 105. One exemplary definition of the distance measure 109c provided by the extended sample matching module 503 includes:

$$d_R(i, j) = \frac{r_i + r_j}{r_{ij}}$$

where ri, represents the number of sample matched by one pattern 103 and rj represents the number of samples matched by another pattern 103. Thus, the distance measure 109c captures both the similarity (rij) and dissimilarity (ri+rj) between two patterns/rules 103. For example, preferably, we should not cluster two rules/patterns together if dR>1 since there is more dissimilarity than similarity between the two patterns 103.

Sample Attribute Matching Module 502

The sample attribute matching module 502 is adapted to determine the distance 109a based upon the samples 302 and attribute values 301 between data clusters 105 induced by two or more patterns 103. That is, the sample attribute matching module 502 determines a distance 109a as a function of both the sets of matching samples 302 and matching attribute values 301 (having corresponding attributes 303). Further, a predetermined weighting may be given to increase/decrease the effect of the attribute values 301 or the samples 302 on the overall distance measured 109a. For example, if it is considered that the number of matched samples 302 and matched attribute values 301 are equally important, a predetermined constant of 0.5 may be used with each of the matched sample 302 measure and the matched attribute values 301 measure.

Example Calculation of the Distance 109

Referring to FIG. 6, shown are exemplary pattern induced data clusters 105a, and 105b (indicated as I(i) and I(j) respectively). That is, each of the data clusters 105a is a set of compound events containing a pattern (for example $x_i$ and $x_j$) respectively. As discussed earlier, to measure the distance between two patterns, the prototyping module 106 combines individual data clusters (e.g. merge I(i) and I(j)). In one example, the merged resultant data cluster 107 resulting from data clusters I(i) and I(j) is the union of their matching/common samples 302 and attribute values 301 (identified generally as resultant data cluster 107). Once the resultant data cluster 107 is obtained, the distancing module 108 calculates the distance 109 between patterns. According to this embodiment, the area defined by the resultant data cluster 107 is used by the sample attribute matching module 502 to calculate distance 109. One possible measured distance 109a that considers both the matching/common samples 302 and attribute values 301 is:

$$d_{RC}(i, j) = w_r \frac{r_i + r_j}{r_{ij}} + w_c \frac{c_i + c_j}{c_{ij}}$$

where predetermined constants $w_r$ and $w_c$ are the weights of the rows (r) (samples 302) and the columns (c) (attributes 303 and corresponding attribute values 301) respectively. If $w_r + w_c = 1$, $d_{RC} > 1$ again can be used as a natural stopping criterion. For example, if we consider the number of matched samples 302 and matched attribute values 301 equally important, we may set $w_r$ and $w_c$ to 0.5.

Entropy Based Distance Module 504

According to an alternate embodiment also illustrated in FIG. 5, the distancing module 108 further comprises the entropy based distance module 504. In this case, the distance measured 109b by the entropy based distance module 504 quantifies the degree of variation in the resultant data cluster 107 and even corresponding data clusters 105.

Preferably, to obtain good data clusters 105 for use in subsequent clustering algorithms or other similar applications, it is desirable to minimize the variations in the clusters 105. Thus, the entropy based distance module 105 calculates the variation/uncertainty within data clusters 105 induced by patterns 103 as a measure of entropy. As will be described, the entropy based distance module 105 may alternatively calculate the variation/uncertainty within corner regions (area within a resultant data cluster 107 but outside pattern induced data clusters 105).

Figure 7B:
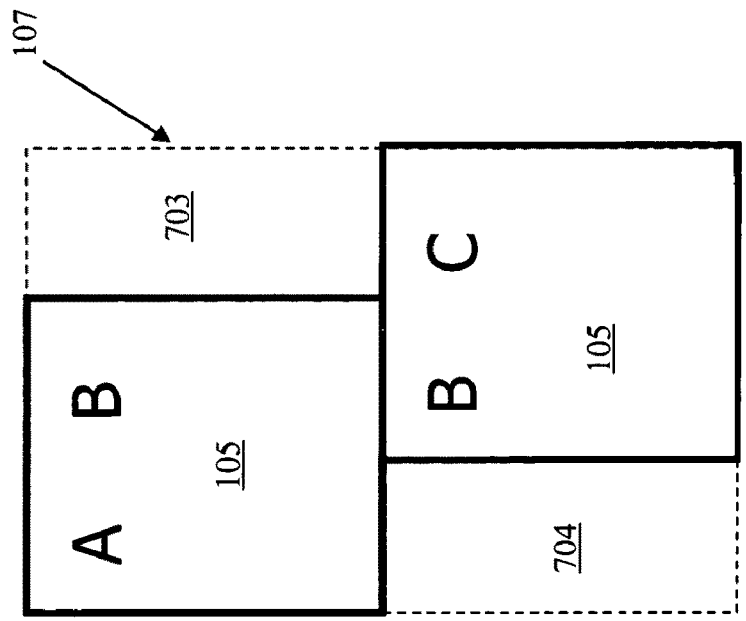
FIGS. 7a and 7b are exemplary data clusters for comparing different distance measures provided by the distancing module of FIG. 1.
Figure 7A:
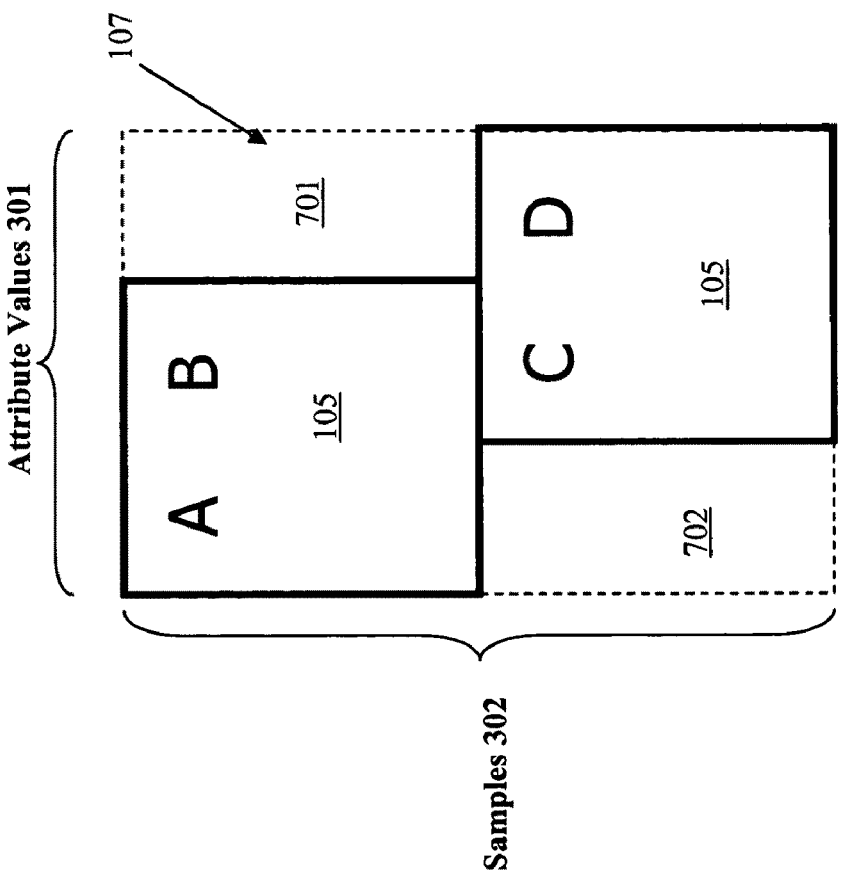

The advantage of calculating variation within and/or outside data clusters 105 may be seen through the exemplary data clusters 105 and resultant data clusters 107 illustrated in FIGS. 7a-7b and FIGS. 8a-8b. For example, in FIGS. 7a and 7b, if the areas of the corner regions (identified as 701, 702, 703, and 704) are the same for the two pairs of patterns 103, then the distance provided by sample-matching and sample attribute matching as provided by the sample attribute matching module 502 would consider the two pairs of patterns (e.g. the first pair: data clusters 105 induced by patterns [A B] and [C D], the second pair of patterns: shown as data clusters 105 induced by patterns [A B] and [B C]) to have equal distance. However, the clusters 105 shown in FIG. 7b are closer than the clusters 105 shown in FIG. 7a because the two patterns in the pair of clusters 105 shown in FIG. 7a share the primary event B in the second attribute 303.

Figure 8B:
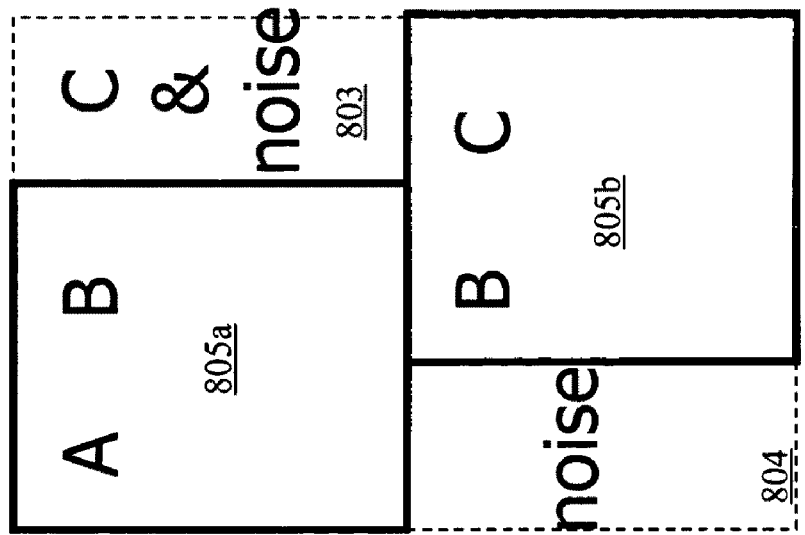
FIGS. 8a and 8b are exemplary data clusters for comparing different distance measures provided by the distancing module of FIG. 1.
Figure 8A:
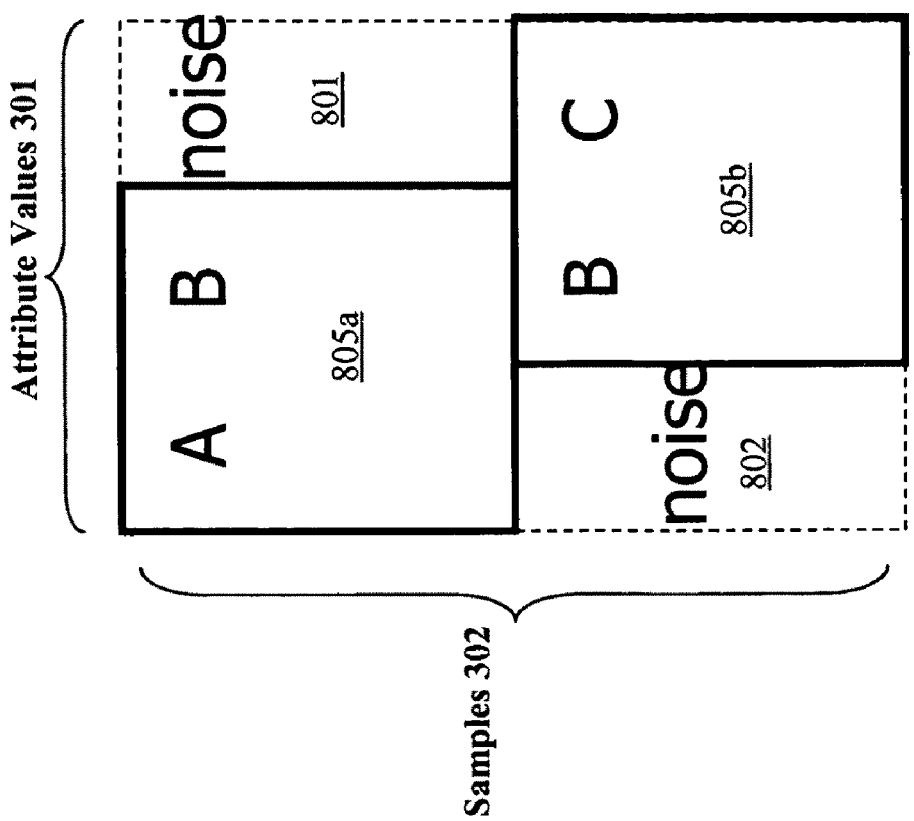

As another example, consider the two identical pattern pairs (or data clusters identified as 805a and 805b) in FIGS. 8a and 8b. In this case, the corner regions 801 and 802 shown in FIG. 8a (the regions not induced by any patterns 103) contain mainly noise where the corner region 803 contain mainly primary event C with some noise. Even though the two clusters 805a in FIGS. 8a and 8b are the same and the two clusters 805b in FIGS. 8a and 8b are the same, the second pair of clusters 805a and 805b shown in FIG. 8b appear to have a closer distance than the first pair of clusters 805a and 805b shown in FIG. 8a because the events in corner region 803 appear to be more consistent with the patterns 103 present in data clusters 805a and 805b. Thus, the entropy based distance module 504 calculates variation within data clusters 105 induced by patterns 103 and variations within corner regions (e.g. 801-804) not induced by patterns 103.

As will be shown by the following example, the entropy measurement is based upon the probability distributions of compound events either induced by a pattern (e.g. data cluster 105) or events not induced by a pattern 103 (e.g. corner regions 111a-111b; 701-704; and 801-804). As will be described, the entropy measurement calculated within data clusters 105 induced patterns 103 is based upon the assumption that the compound events induced by patterns are independent which is not always the case. Thus, a more precise measure may be to calculate the entropy of the corner regions after inducing data clusters 105 via the pattern inducing module 104 and defining a resultant data cluster 107 via the prototyping module 106. As defined earlier, the resultant data cluster 107 may be a result of merging the data clusters 105. According to one embodiment, since it is clear that when merging two data clusters 105, the only sources of variation come from the corner regions, the entropy based distance module 504 provides a distance measure 109 representative of the entropy in the corner regions (not induced by patterns 103). Further, to minimize variation and obtain good data clusters 105 within a resultant data cluster 107, it is desirable to minimize the entropy in the corner regions.

The following example provides sample entropy calculations provided by the entropy based distance module 504 over different regions of the samples 302 and attributes 303 of the resultant data cluster 107. Such regions include entropy calculations within data clusters 105, entropy calculations outside data clusters 105 (within corner regions) and entropy normalization measures to provide a distance measure 109 which accounts for the number of matching samples 302 and attributes 303 within a resultant data cluster 107.

Referring again to FIGS. 1 and 5, once the distance measure 109 (e.g. entropy based distance 109a, sample attribute matching distance 109b or other type of predefined distance) is obtained, the distance measure 109 is stored within the distance measure repository 110 for further analysis. That is, once a distance measure 109 is defined, it is stored within the distance measure repository 110 and can be used for various tasks for analyzing patterns such as pattern pruning, clustering and summarization.

Examples of Entropy Distance Definitions 109b Provided by the Entropy Based Distance Module 504

A common measure of variation/uncertainty for discrete-valued data such as data set 101 is entropy:

$$H(I) = \sum_{x^s \in I} P(x^s) \log P(x^s)$$

where P(xs) is the joint probability distribution of the compound event xs and I is the abbreviation of I(1, ... ,n) (e.g. data clusters 105 defined within a resultant data cluster 107).

However, the number of parameters in estimating $P(x^s)$ is exponential. For $|s|$ binary variables, it is of order $O(2^{|s|})$. Hence, it is impractical to estimate $P(x^s)$ directly due to the lack of data in most real-world problems. To reduce the number of parameters, the entropy based distance module 504 may be configured to assume that the attributes are conditionally independent given a data cluster 105. The joint entropy is then estimated by summing up the entropy of individual attributes 303:

$$H(I) = \sum_{i \in s} \sum_{x_i \in x^s, x^s \in I} P(x_i) \log P(x_i)$$

where s is the attribute 303 index set of I. $P(x_i)$ is the probability of the primary event $x_i$ in I and is estimated by:

$$P(x_i) = \frac{o_{x_i}}{|I|}$$

where $o_{x_i}$ is the observed frequency of $x_i$ in I and $|I|$ is the number of compound events in data cluster 105 (referred to as I). The computation complexity of H(I) above is $O(|I||s|)$. Since $|s|$ is usually much smaller than $|I|$, the complexity could be $O(|I|)$, which is linear.

All constant clusters 105 have zero entropy. For example, in FIG. 4C, H(I(1))=0 and H(I(2))=0. When merging patterns $x_I^{\{3,4,5,6\}}$ and $x_2^{\{7,8,9,10\}}$ the entropy of the merged data cluster 450 increases (e.g. H(I(1, 2))=3.66), indicating that variation/uncertainty of the clusters increases due to the merging. Note that H(I(1,2,3))=H(I(1, 2))=3.66 since merging I(1, 2) (data cluster 450) and I(3) (data cluster 454) results in the same data cluster 450 as I(1, 2). Hence, the variation of the cluster 105 does not increase. When all values in each attribute 303 are equiprobable, the entropy is maximal.

Note that H(I) is bounded as $$0 \leq H(I) \leq \sum_{i \in s} \log m_i,$$

where $m_i$ is the number of possible values of the ith attribute 303. Hence, the entropy based distance module 504 can normalize the entropy measure H(I) as follows:

$$\underline{H}(I) = \frac{H(I)}{\sum_{i \in s} \log m_i}$$

H(I) does not explicitly consider the numbers of matched samples 302 and matched attributes 303. Hence, the entropy based distance module 504 further weights it by the area of I:

$$d_O(I) = |I||s|\underline{H}(I)$$

where |I| is the number of compound events in I and |s| is the number of attributes 303 in I.

An appropriate weighting is important for comparing the normalized entropies in regions (e.g. data clusters 105) with different sizes. Intuitively, larger regions (e.g. data clusters 105) should have greater impact than smaller regions and thus should be assigned with greater weight. For example, it may be acceptable to have a small region with high variation, but unacceptable to have a large region with small variation.

One problem of the above entropy measure (e.g. distance measure 109) is that the conditional independence assumption may not be realistic. If a compound event is said to be a pattern 103, we reject the null hypothesis that the primary events of the compound event are independent. Hence, the compound event induced a pattern 103 (e.g. pattern induced data clusters 105) are dependent, violating the conditional independence assumption. To address this problem, instead of directly estimating the entropy of the entire resultant data cluster 107, the entropy based distance module provides an estimate the entropy of those data not induced by patterns 107 (e.g. the corner regions defined above). In FIG. 6, since the corner regions (111a, 111b) are not induced by either patterns 103 $x_i^{s_i}$ or $x_j^{s_j}$, it seems more reasonable to assume that the compound events there to be independent rather than assuming that the compound events in the entire data cluster 107 are independent.

Thus, according to the present embodiment, the entropy based distance module 504 estimates the entropy of the corner regions (e.g. 111a-111b) after merging (e.g. provided by the prototyping module 106). As described above, when merging two data clusters 105, the only sources of variation come from the corner regions (e.g. 111a-111b). Hence, it is desirable to minimize the entropy therein. Thus, the entropy based distance measure 109 provided by the entropy based distance module 504 is as follows:

$$d_D(I(i), I(j)) = |I(i|j)||s_{ij}|\underline{H}(I(i|j)) + |I(j|i)||s_{ji}|\underline{H}(I(j|i))$$

where $s_{ij}$ is the attribute 302 index set of I(i|j) (corner region 111b). Note again that the normalized entropy of the corner regions (e.g. 111a-111b) are further weighted appropriately by a predetermined amount by the entropy based distance module 504 when their areas (e.g. areas of corner regions 111a, 111b) are added together.

Further, according to the embodiment illustrated in FIG. 5, the sample attribute module 502 may be coupled to the entropy based distance module 504 and the extended sample matching module 503 may be coupled to the entropy based distance module 504. That is, although the above described measured distances 109a-109c may be obtained independently of one another, more than one distance measure 109 may be obtained such as to improve the accuracy of the distance measure 109. That is, in one embodiment, once the distance measure 109a is obtained via sample attribute matching methods described, the entropy based distance measure 109b is calculated subsequently to obtain a distance measure 109 that is a synthesis of both distances measured 109. For example, the extended sample matching module 503 or sample attribute module 502 could be used to measure distances between patterns first. Then, entropy based distance module 504 is only applied to those pattern pairs that have the same values of extended sample matching module 503 or sample attribute module 502. In other words, in one embodiment, entropy based distance module 504 is only applied to those pattern pairs that are not disguisable by extended sample matching module 503 or sample attribute module 502. The advantage of such combination is that it combines the strength of high speed in extended sample matching module 503 and sample attribute module 502 with the strength of high accuracy in entropy based distance module.

Example Operations of Pattern Relevancy System 100

Figure 19:
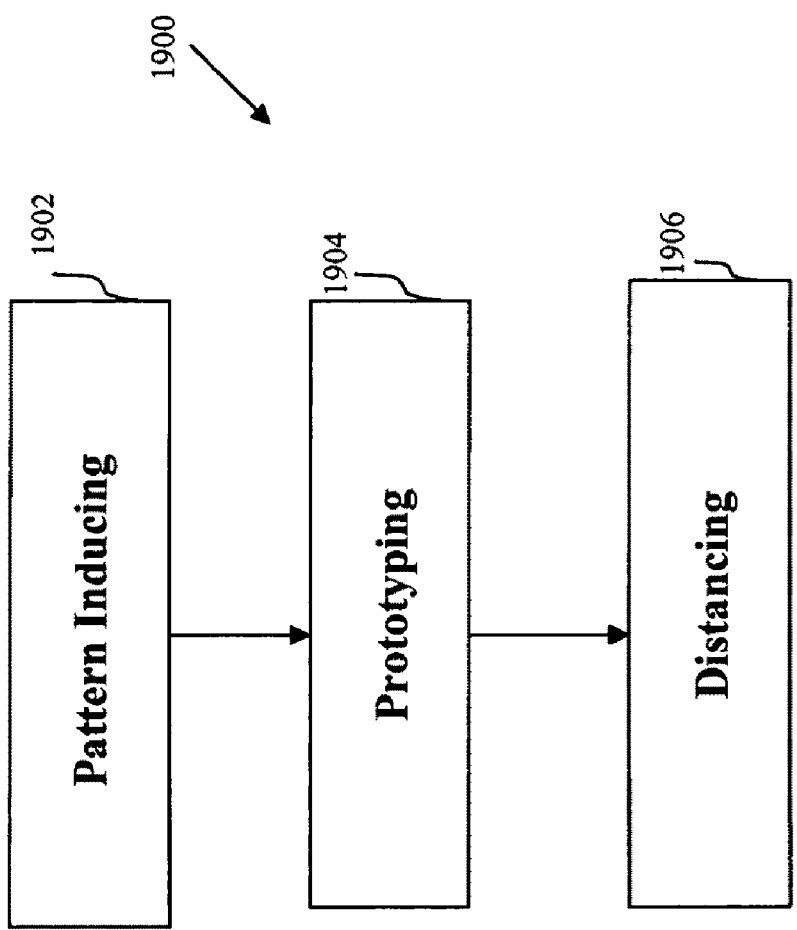
FIG. 19 is a flowchart illustrating example operations of the pattern relevancy system of FIG. 1.

Referring to the flowchart illustrated in FIG. 19, shown is an example operation of the pattern relevancy system 100. At step 1902, the pattern inducing module 104 defines one or more data clusters 105 which contain corresponding patterns 103. At step 1904, the prototyping module 106 defines a resultant data cluster 107 which includes grouping at least some of the samples 302 of each induced data cluster 105 with one another to define a resultant data cluster 107. At step 1906, the distancing module 108 calculates the distance 109 between the patterns 103 as present in the data clusters 105.

Exemplary Definitions of Pattern Induced Data Clusters 105 and Resultant Data Clusters 107

The following description provides an exemplary definition of an induced data set:

Suppose that the pattern mining module 102 produces a set of patterns $\{x_1^{s_1}, x_2^{s_2}, \ldots, x_n^{s_n}\}$. Then, the set of samples 302 matched by the pattern $x_i^{s_i}$ is denoted by $m(i)=\{x \in D | x \underline{X} x_i^{s_i}\}$. As described earlier, the pattern inducing module 104 receives a set of patterns 103 and provides pattern induced data clusters 105 of a pattern $x^{s_i}$, or simply referred to as data cluster 105. Each data cluster 105, is a set of compound events containing $x_i^{s_i}$. Formally, the data cluster 105 induced by $x_i^{s_i}$ may be represented as:

$$I(i) = \{x^s \subseteq x | x \in m(i), s = s_i\}$$

As described earlier, in order for the distancing module 108 to provide a distance measure 109 between two patterns 103, the prototyping module 106 combines clusters 105 (e.g. merges the data clusters 105 to provide a union of the clusters 105). As shown in FIG. 6, consider I(i) and I(j) to be two data clusters (shown as 105a and 105b) induced by patterns $x_i^{s_i}$ and $x_j^{s_j}$ respectively. As described earlier, the set of samples 302 matched by the pattern/rule $x_i^{s_i}$ 103 is denoted by m(i). For example, m(i) and m(j) are matched by patterns/rules $x_i^{s_i}$ and $x_j^{s_j}$ respectively. In FIG. 6, consider variables $r_i$ ($r_j$) to be the number of samples 302 matched by $x_i^{s_i}$ ($x_j^{s_j}$) but not matched by $x_j^{s_j}$ ($x_i^{s_i}$). That is, $r_i = |m(i) \setminus m(j)|$ and $r_j = |m(j) \setminus m(i)|$. Let $r_{ij}$ be the number of samples 302 matched by both $x_i^{s_i}$ and $x_j^{s_j}$. That is, $r_{ij} = |m(i) \cap m(j)|$. Further, consider that $c_i$, $c_j$ and $c_{ij}$ bear the same meaning as $r_i$, $r_j$ and $r_{ij}$ for the set of matching attributes 303.

Referring again to FIG. 6, in one embodiment, the merged data cluster of I(i) 105a and I(j) 105b (e.g. the resultant data cluster 107) is the union of their matched samples 302 and matched attributes 303. More precisely, $$I(i,j) = \{x^s \subseteq x | x \in m(i) \cup m(j), s = s_i \cup s_j\}$$

The above definition can be generalized to n patterns, i.e., $I(1, \ldots, n) = \{x^s \subseteq x | x \in m(1) \cup \ldots \cup m(n), s = s_1 \cup \ldots \cup s_n\}$. For instance, in FIG. 4C, the prototyping module 106 provides a resultant data cluster 107 (e.g. the highlighted block I(1, 2) (data cluster 450)) by merging I(1) (data cluster 456) and I(2) (data cluster 452). Note that data cluster 450 I(1,2,3), is merged from the three data clusters 105 and is the same as I(1, 2).

As described earlier with reference to FIG. 6, the highlighted rectangles are actually the induced data clusters I(i) 105a, and I(j) 105b. In addition, when the two data clusters, say I(i) 105a and I(j) 105b, are merged by the prototyping module 106, the compound events in the top-right and bottom-left corner regions are added into the merged data cluster (resultant data cluster 107). The corner regions may be defined respectively by:

$$I(i|j) = \{x^s \subseteq x | x \in m(i) \setminus m(j), s = s_j \setminus s_i\}$$

and $$I(j|i) = \{x^s \subseteq x | x \in m(j) \setminus m(i), s = s_i \setminus s_j\}$$

As described earlier, these definitions of data clusters 105 and remaining corner regions (e.g. I(i|j) 111b) are used by the entropy based distance module 504 to calculate the entropy within data clusters 105 and within the corner regions.

Example Results of Operation of Module 100 and Calculation of Distance 109

The following discussion provides calculations of distance measure 109a for sample attribute matching provided by the sample attribute matching module 502 and the entropy based distance measure 109b entropy based distance module 504 according to various different cases illustrated in FIGS. 9-16.

Referring to FIGS. 9-16, the data set 101 is represented by a storage or database 300 which contains attribute values 301 (corresponding to attributes 303) and samples 302. Within each database 300 there exists data clusters 105 induced by patterns 103. As discussed with reference to FIG. 6, the variables $r_i$ ($r_j$) illustrated represent the number of samples 302 matched by pattern $x_i^{s_i}$ ($x_j^{s_j}$) 103 but not matched by patterns $x_j^{s_j}$ ($x_i^{s_i}$) 103. That is, considering the case where there are two patterns, each of the variables $r_i$ ($r_j$) represent the number of samples 302 that are induced by one pattern different than the pattern inducing the other data cluster 105. Further, the variable $r_{ij}$ represents the number of samples 302 matched by both patterns $x_i^{s_i}$ and $x_j^{s_j}$ 103. That is, the variable $r_{ij}$ for example represents the number of samples 302 that are common between two or more data clusters 105 (or the overlapping region between two data clusters). That is, $r_{ij} = |m(i) \cap m(j)|$. Further, variables $c_i$, $c_j$ and $c_{ij}$ bear the same meaning as $r_i$, $r_j$ and $r_{ij}$ for the set of matching attributes.

Case 1: Two Data Clusters 105 with Some Overlapping Attributes 303

Figure 9:
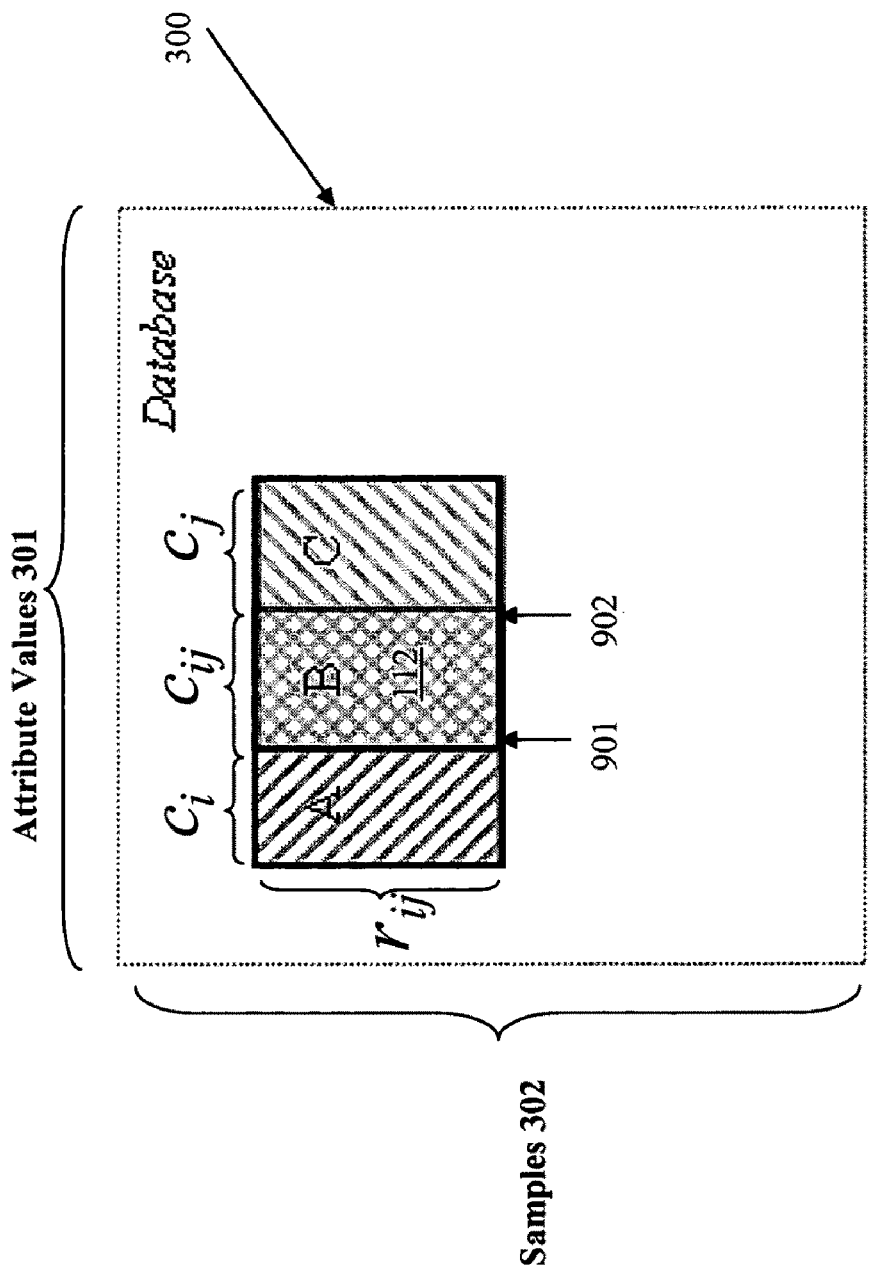
FIG. 9-16 are schematic diagrams illustrating exemplary data clusters and corresponding patterns having various sample and attribute relationships.

This case is illustrated in FIG. 9, where the data clusters 901 and 902 induced by patterns [A B] and [B C] share an overlapping portion 112 shown as pattern B. For example, suppose that $r_{ij}=10$, $r_i=0$, $r_j=0$, $c_{ij}=5$, $c_i=5$, $c_j=5$ then the following distance measures 109 may be obtained:

Extended Sample Matching Distance 109c: measures both the similarity and dissimilarity between two patterns/rules 103 (for example as a function of the number of samples 302 where the patterns 103 share or differ):

$$d_R(i,j) = \frac{r_i + r_j}{r_{ij}} = 0$$

Sample Attribute Matching Distance 109a: measures distances of patterns 103 by counting the number of samples 302 and attributes 303 where they share or differ:

$$d_{RC}(i,j) = w_r \frac{r_i + r_j}{r_{ij}} + w_c \frac{c_i + c_j}{c_{ij}} = 0.5 \times 0 + 0.5 \times 2 = 1,$$

where $w_r=0.5$ and $w_c=0.5$ are the weights of rows (samples 302) and columns (attributes 303) respectively.

$$d_{RC2}(i,j) = \frac{r_j \times c_i + r_i \times c_j}{(r_i + r_j + r_{ij}) \times (c_i + c_j + c_{ij})} = \frac{0}{10 \times 15} = 0$$

$$d_{RC3}(i,j) = \frac{r_j \times (c_i+1) + r_i \times (c_j+1)}{(r_i + r_j + r_{ij}) \times (c_i + c_j + c_{ij}+1)} = \frac{0}{10 \times 16} = 0$$

Entropy-based distance 109b: measures distances of patterns 103 by quantifying the degree of variation in the sample-attribute matching region:

$$d_o(I) = |I||s|\underline{H(I)} = 10 \times 15 \times 0 = 0$$

$d_c(I)$=number of different values for the joint attributes=1 (i.e. the value A B C)

$d_{c2}(I)$=number of different combinations for the each attributes=0

Case 2: Two Data Clusters 105 with Some Overlapping Attributes 303 and Samples 302

Figure 10:
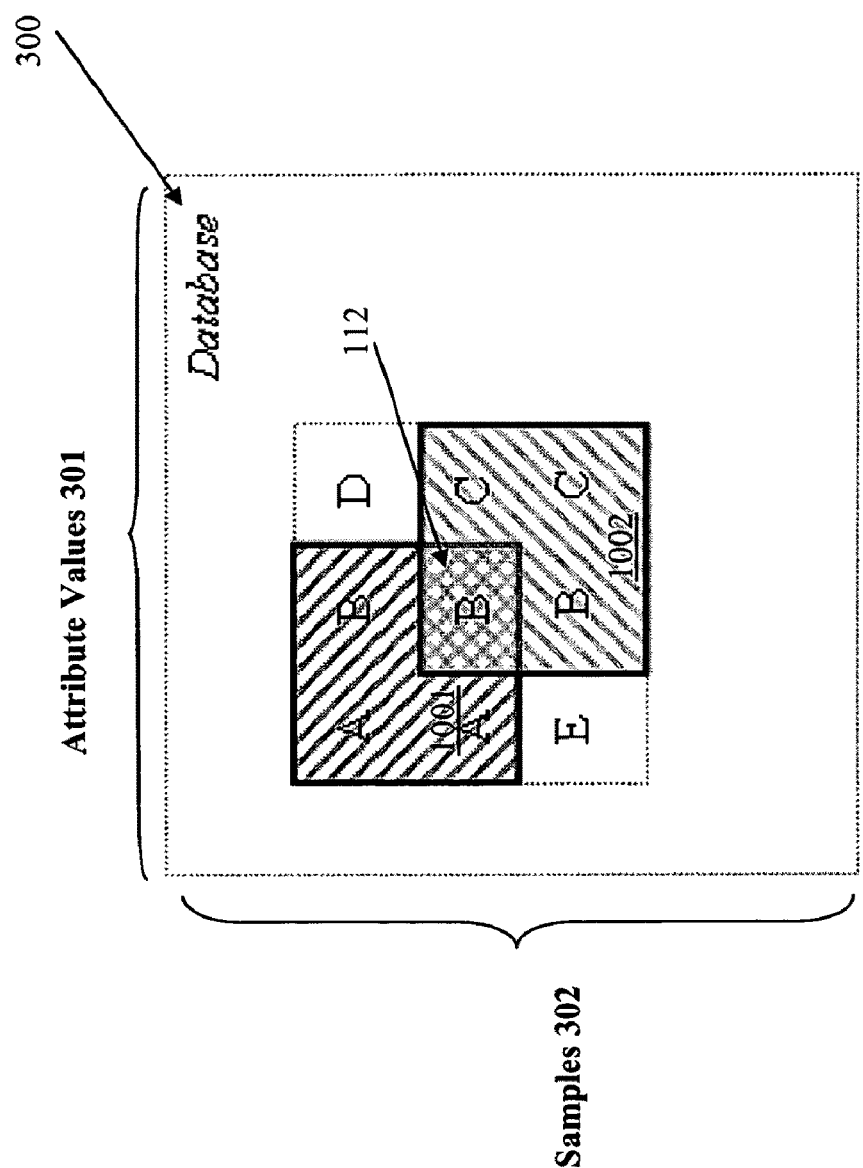

This case is illustrated in FIG. 10, where the data cluster 1001 induced by pattern [A B] and the second data cluster 1002 induced by pattern [B C] share an overlapping portion 112 shown as attribute value B. For example, suppose $r_{ij}=5$, $r_i=5$, $r_j=5$, $c_{ij}=5$, $c_i=5$, $c_j=5$) then the follow distance measures 109 may be obtained:

Extended Sample Matching Distance 109c:

$$d_R(i,j) = \frac{r_i + r_j}{r_{ij}} = 2$$

Sample-Attribute-Matching Distance 109a:

$$d_{RC}(i,j) = w_r \frac{r_i + r_j}{r_{ij}} + w_c \frac{c_i + c_j}{c_{ij}} = 0.5 \times 2 + 0.5 \times 2 = 2$$

$$d_{RC2}(i,j) = \frac{r_j \times c_i + r_i \times c_j}{(r_i + r_j + r_{ij}) \times (c_i + c_j + c_{ij})} = \frac{25 + 25}{15 \times 15} = 0.22$$

$$d_{RC3}(i,j) = \frac{r_j \times (c_i+1) + r_i \times (c_j+1)}{(r_i + r_j + r_{ij}) \times (c_i + c_j + c_{ij}+1)} = \frac{30 + 30}{15 \times 16} = 0.25$$

Entropy-Based Distance 109b:
If ABD, ABC and EBC each occur 5 times, $$d_o(I) = |I||s|$$

$$H(I) = 15 \times 15 \times \frac{2 \times \left(\left(-\frac{2}{3}\ln\frac{2}{3} - \frac{1}{3}\ln\frac{1}{3}\right) / \ln 2\right)}{3}$$
$$= 15 \times 15 \times 0.61$$
$$= 137.74$$

$d_c(I)$=number of different values for the joint attributes=3 (i.e. ABD, ABC and EBC)

$d_{c2}(I)$=number of different combinations for the each attributes=4 (i.e. $1^{st}$ attribute 2 AEs; $3^{rd}$ attribute 2 DCs) or normalized as $$\frac{4}{3 \times \binom{3}{2}} = 0.45$$

Case 3: Two Data Clusters 105 with No Overlapping Attributes 303 and Samples 302

Figure 11:
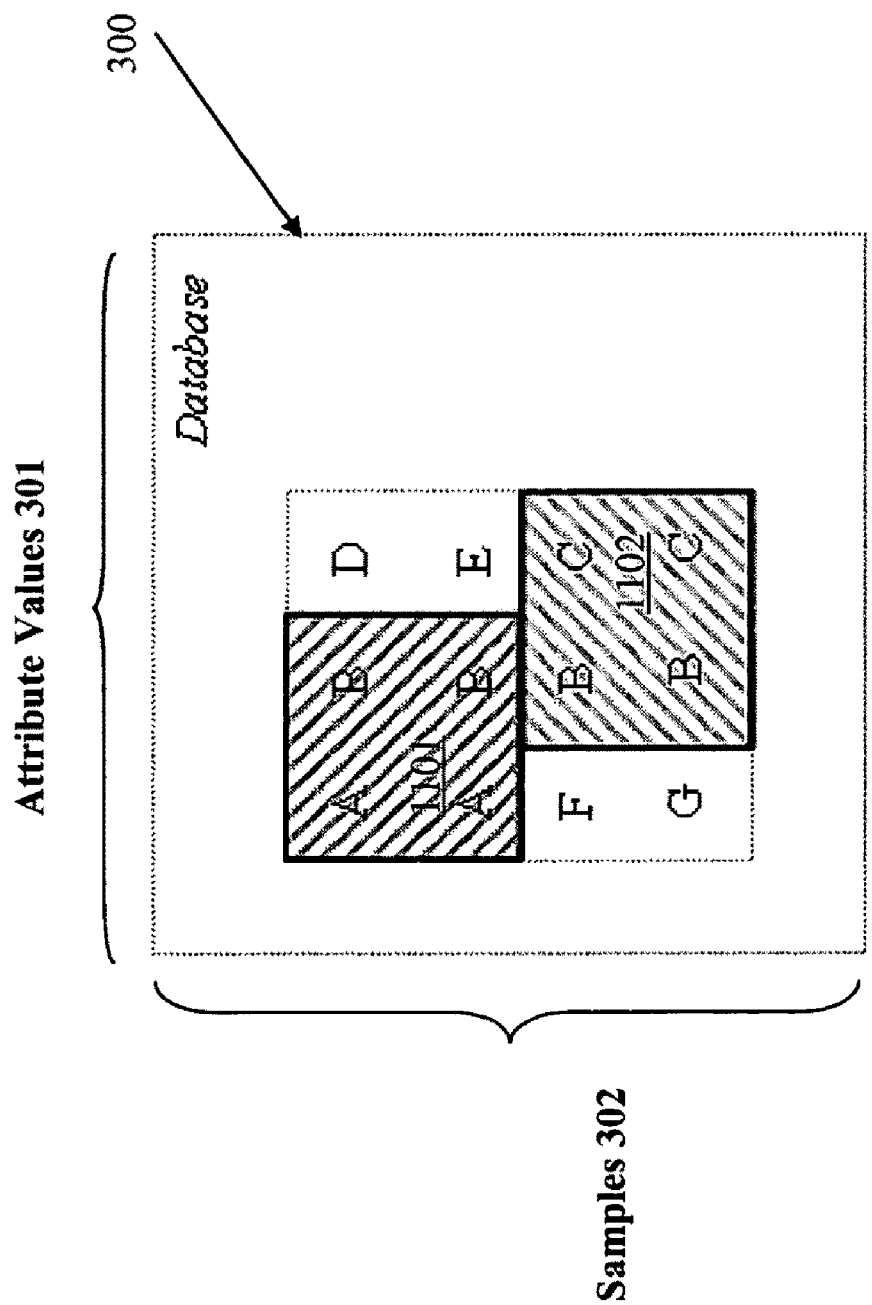

This case is illustrated in FIG. 11, where the data cluster 1101 induced by pattern [A B] and the second data cluster 1102 induced by pattern [B C] share no overlapping portions. For example, suppose $r_{ij}=0$, $r_i=10$, $r_j=10$, $c_{ij}=5$, $c_i=5$, $c_j=5$) then the following distance measures 109 may be obtained:

Extended Sample Matching Distance 109c:

$$d_R(i,j) = \frac{r_i + j}{r_{ij}} = \infty$$

Sample-Attribute-Matching Distance 109a:

$$d_{RC}(i,j) = w_r \frac{r_i + r_j}{r_{ij}} + w_c \frac{c_i + c_j}{c_{ij}} = \infty$$

$$d_{RC_2}(i,j) = \frac{r_i \times c_i + r_i \times c_j}{(r_i + r_j + r_{ij}) \times (c_i + c_j + c_{ij})} = \frac{50 + 50}{20 \times 15} = 0.33$$

$$d_{RC_3}(i,j) = \frac{r_i \times (c_i+1) + r_i \times (c_j+1)}{(r_i + r_j + r_{ij}) \times (c_i + c_j + c_{ij}+1)} = \frac{60 + 60}{20 \times 16} = 0.38$$

Entropy-Based Distances (109b):
If ABD, ABE, GBC and FBC occur 5 times, $$d_o(I) = |I||s|$$

$$\underline{H(I)} = 20 \times 15 \times \frac{2 \times \left(\left(-\frac{1}{2}\ln\frac{1}{2} - \frac{1}{4}\ln\frac{1}{4} - \frac{1}{4}\ln\frac{1}{4}\right) / \ln 3\right)}{3}$$
$$= 20 \times 15 \times 0.63$$
$$= 189.2789$$

$d_c(I)$=number of different values for the joint attributes=4 (i.e. ABD, ABE, GBC and FBC)

$d_c(I)$=number of different combinations for the each attributes=10 (i.e. $1^{st}$ attribute 2 AFs, 2 AGs and FG $3^{rd}$ attribute DE, 2 DCs and 2 ECs) or normalized as $$\frac{10}{3 \times \binom{4}{2}} = 0.56$$

Figure 12:
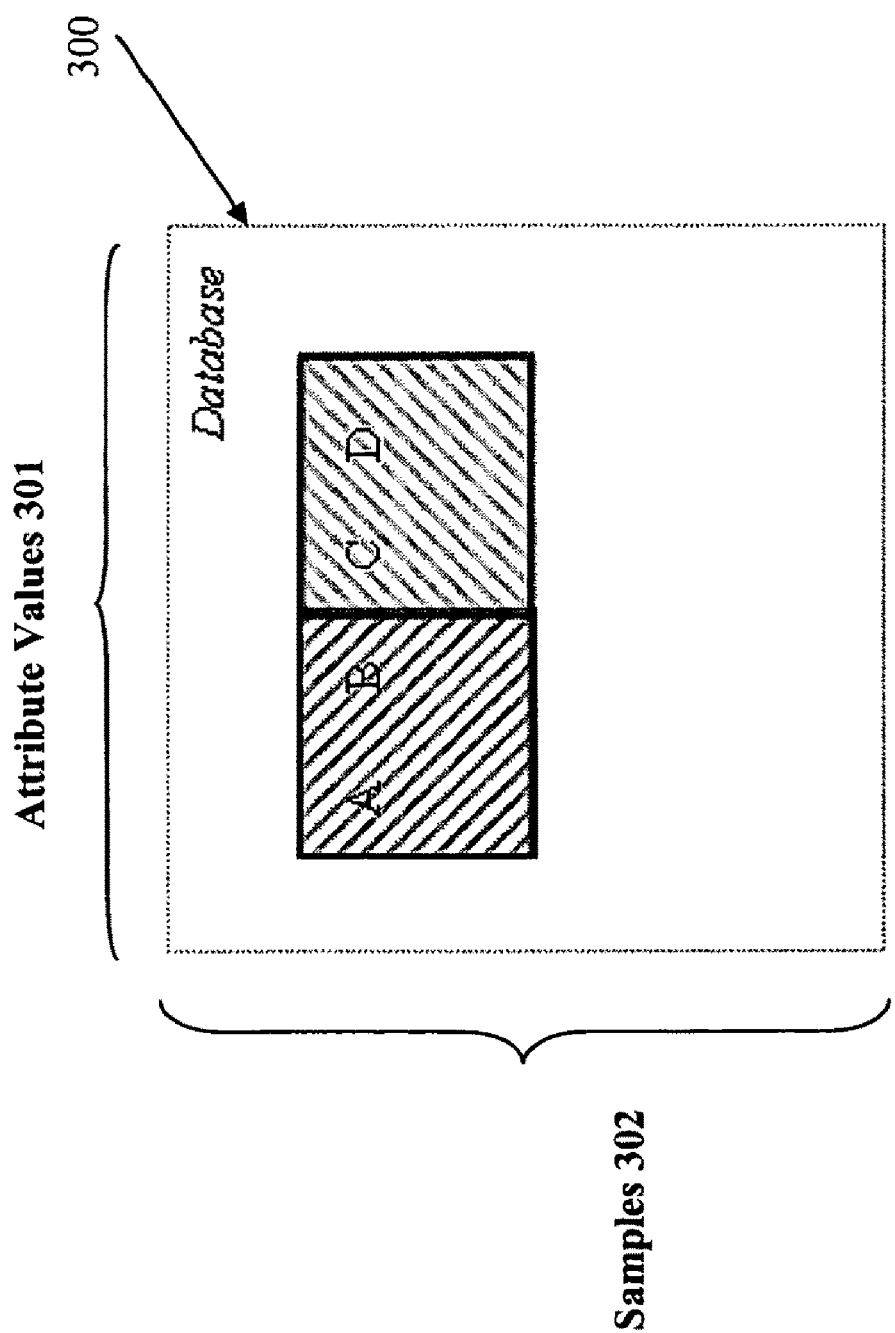

Case 4: As illustrated in FIG. 12, suppose rij=10, ri=0, rj=0, cij=0, ci=10, cj=10
Extended Sample Matching Distance 109c:

$$d_R(i,j) = \frac{r_i + r_j}{r_{ij}} = 0$$

Sample-Attribute-Matching Distances (109a):

$$d_{RC}(i,j) = w_r \frac{r_i + r_j}{r_{ij}} + w_c \frac{c_i + c_j}{c_{ij}}$$
$$= 0.5 \times 0 + 0.5 \times \infty$$
$$= \infty \text{ or}$$

if $w_r=1$ and $w_c=0$, then $d_{RC}(i,j)=0$ $$d_{RC2}(i,j) = \frac{r_j \times c_i + r_i \times c_j}{(r_i + r_j + r_{ij}) \times (c_i + c_j + c_{ij})}$$
$$= \frac{0}{10 \times 20}$$
$$= 0$$

$$d_{RC3}(i,j) = \frac{r_j \times (c_i + 1) + r_i \times (c_j + 1)}{(r_i + r_j + r_{ij}) \times (c_i + c_j + c_{ij} + 1)}$$
$$= \frac{0}{10 \times 21}$$
$$= 0$$

Entropy-Based Distances (109b)

$$d_o(I) = |I||s|\underline{H}(I) = 20 \times 15 \times 0 = 0$$

$d_c(I)$=number of different values for the joint attributes=1

$d_c(I)$=number of different combinations for the each attributes=0

Figure 13:
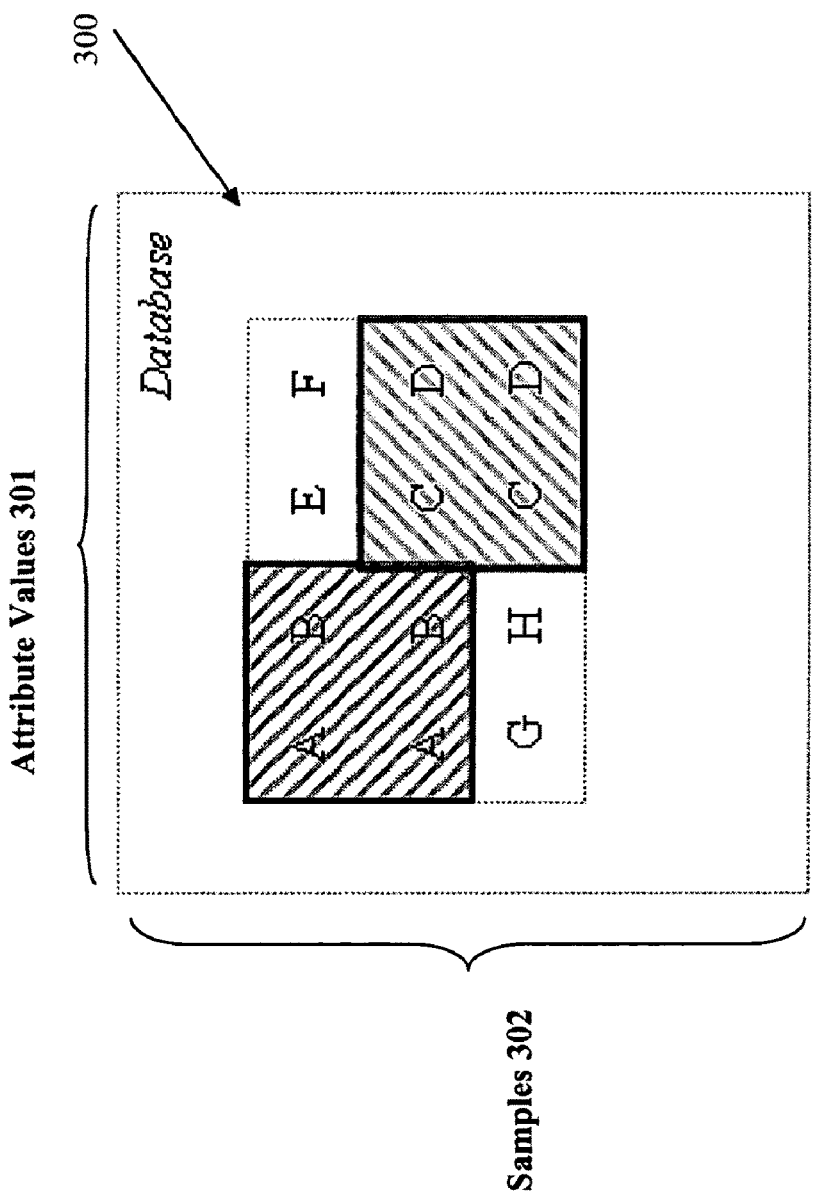

Case 5: As illustrated in FIG. 13, shown are two data clusters 105 with shared samples 302 but no shared attributes 303 within those samples 302. In this case, suppose rij=5, ri=5, rj=5, cij=0, ci=10, cj=10)

Extended Sample Matching Distance 109c:

$$d_R(i,j) = \frac{r_i + r_j}{r_{ij}} = 2$$

Sample-Attribute-Matching Distances (109a):

$$d_{RC} = (i,j)$$
$$= w_r \frac{r_i + r_j}{r_{ij}} + w_c \frac{c_i + c_j}{c_{ij}}$$
$$= 0.5 \times 2 + 0.5 \times \infty$$
$$= \infty \text{ or}$$

if $w_r=1$ and $w_c=0$, then $d_{RC}(i,j)=1$ $$d_{RC2}(i,j) = \frac{r_j \times c_i + r_i \times c_j}{(r_i + r_j + r_{ij}) \times (c_i + c_j + c_{ij})}$$
$$= \frac{50 + 50}{15 \times 20}$$
$$= 0.33$$

$$d_{RC3}(i,j) = \frac{r_j \times (c_i + 1) + r_i \times (c_j + 1)}{(r_i + r_j + r_{ij}) \times (c_i + c_j + c_{ij} + 1)}$$
$$= \frac{55 + 55}{15 \times 21}$$
$$= 0.35$$

Entropy-Based Distances (109b)

If ABEF, ABCD and GHCD each occur 5 times, $$d_o(I) = |I||s|\underline{H}(I)$$
$$= 15 \times 20 \times \frac{4 \times \left(\left(-\frac{2}{3}\ln\frac{2}{3} - \frac{1}{3}\ln\frac{1}{3}\right) / \ln 2\right)}{4}$$
$$= 15 \times 20 \times 0.92$$
$$= 275.49$$

$d_c(I)$=number of different values for the joint attributes=3

$d_c(I)$=number of different combinations for the each attributes=8 (i.e. $1^{st}$ attribute 2AGs; $2^{nd}$ attribute 2 BHs; $3^{rd}$ attribute 2 ECs; $4^{th}$ attribute 2 FDs) or normalized as $$\frac{8}{4 \times \binom{3}{2}} = 0.67$$

Figure 14:
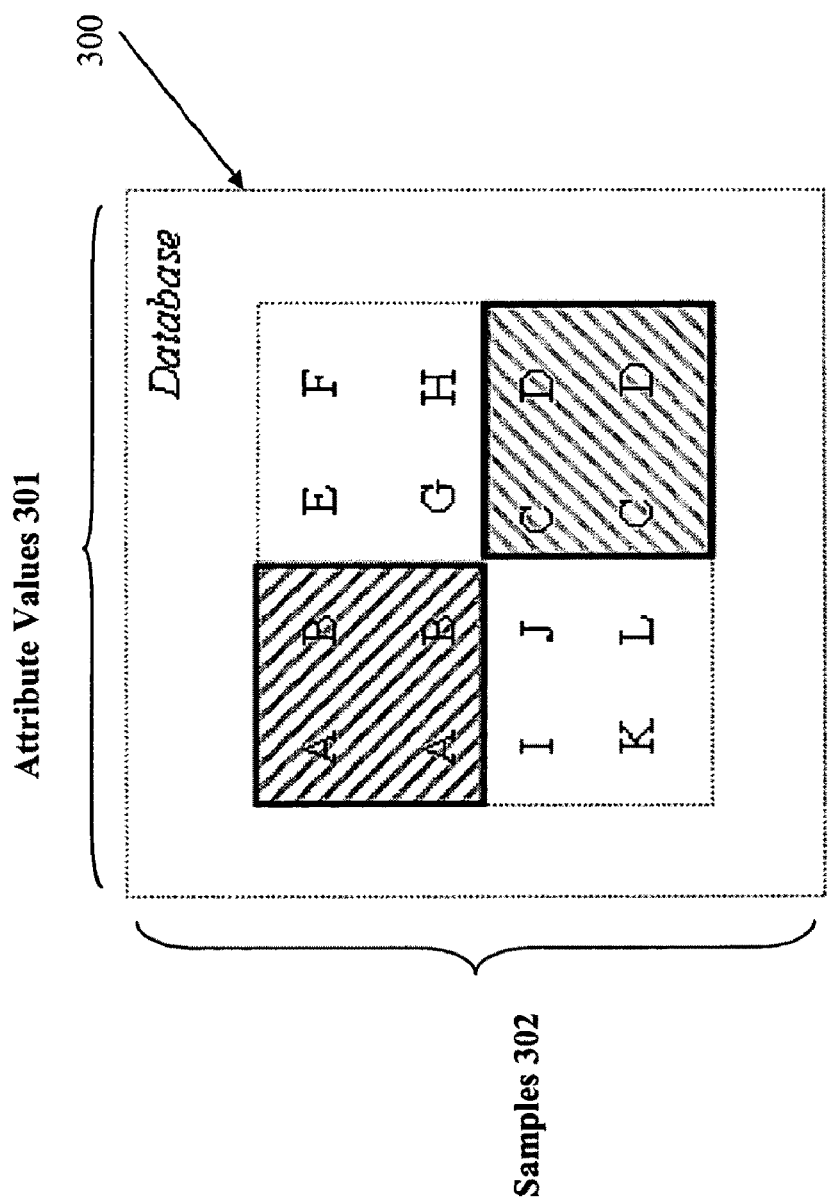

Case 6: As illustrated in FIG. 14, suppose rij=0, ri=10, rj=10, cij=0, ci=10, cj=10)

Extended Sample Matching Distance 109c:

$$d_R(i,j) = \frac{r_i + r_j}{r_{ij}} = \infty$$

Sample-Attribute-Matching Distances (109a)

$$d_{RC}(i,j) = w_r \frac{r_i + r_j}{r_{ij}} + w_c \frac{c_i + c_j}{c_{ij}}$$
$$= 0.5 \times \infty + 0.5 \times \infty$$
$$= \infty$$

$$d_{RC2}(i,j) = \frac{r_j \times c_i + r_i \times c_j}{(r_i + r_j + r_{ij}) \times (c_i + c_j + c_{ij})}$$
$$= \frac{100 + 100}{20 \times 20}$$
$$= 0.5$$

$$d_{RC3}(i,j) = \frac{r_j \times (c_i + 1) + r_i \times (c_j + 1)}{(r_i + r_j + r_{ij}) \times (c_i + c_j + c_{ij} + 1)}$$
$$= \frac{110 + 110}{20 \times 21}$$
$$= 0.52$$

Entropy-Based Distances (109b)

If ABEF, ABGH, IJCD and KLCD each occur 5 times, $$d_o(I) = |I||s|H(I)$$

$$= 20 \times 20 \times \frac{4 \times \left(\left(-\frac{1}{2}\ln\frac{1}{2} - \frac{1}{4}\ln\frac{1}{4} \times 2\right) / \ln 3\right)}{4}$$

$$= 20 \times 20 \times 0.95$$

$$= 378.56$$

$d_c(I)$=number of different values for the joint attributes=4

$d_c(I)$=number of different combinations for the each attributes=20 or normalized as $$\frac{20}{4 \times \binom{4}{2}} = 0.83$$

Figure 15:
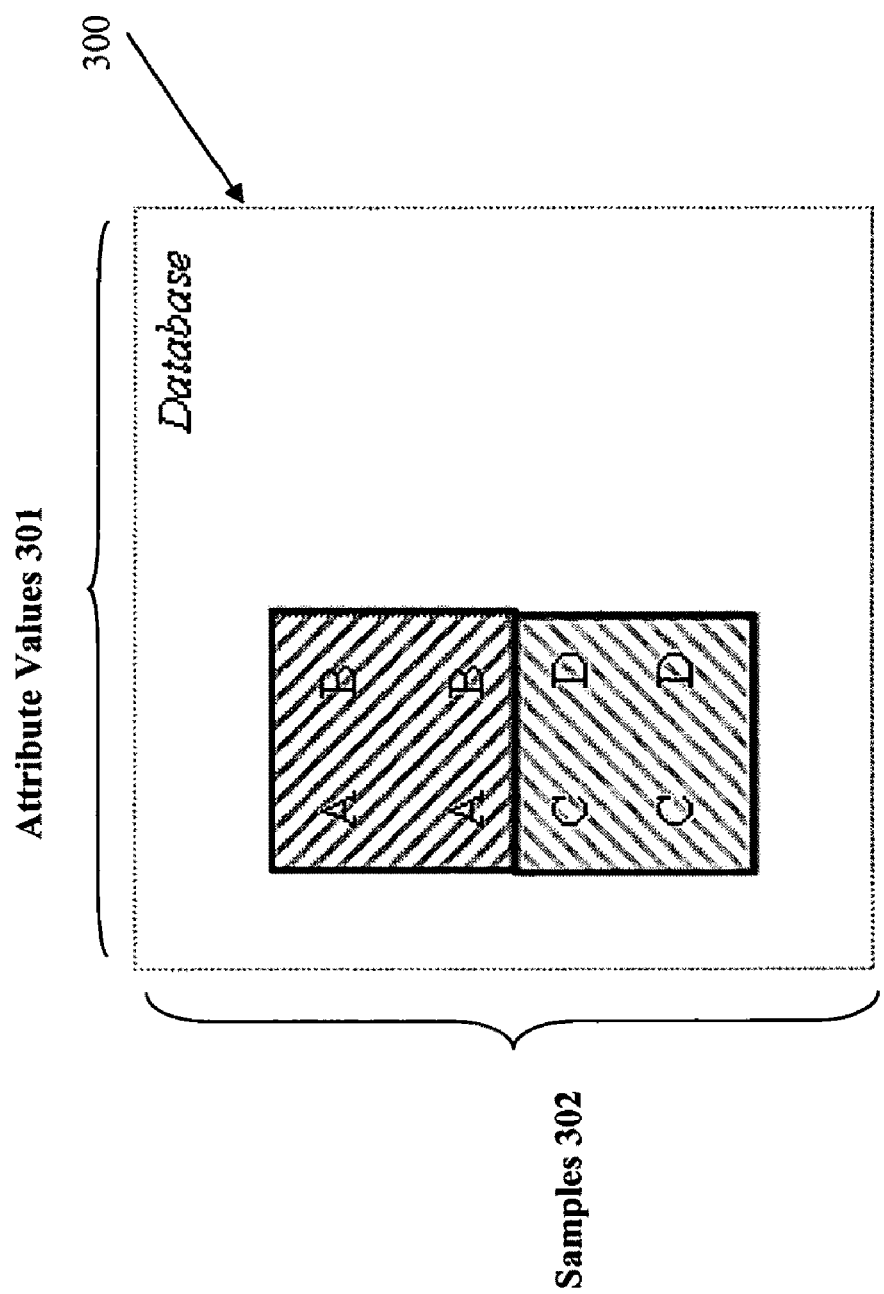

Case 7: As illustrated in FIG. 15, suppose rij=0, ri=10, rj=10, cij=10, ci=0, cj=0)

Extended Sample Matching Distance 109c:

$$d_R(i,j) = \frac{r_i + r_j}{r_{ij}} = \infty$$

Sample-Attribute-Matching Distances (109a):

$$d_{RC}(i,j) = w_r \frac{r_i + r_j}{r_{ij}} + w_c \frac{c_i + c_j}{c_{ij}}$$

$$= 0.5 \times \infty + 0.5 \times 0$$

$$= \infty$$

$$d_{RC2}(i,j) = \frac{r_j \times c_i + r_i + c_j}{(r_i + r_j + r_{ij}) \times (c_i + c_j + c_{ij})}$$

$$= \frac{0}{20 \times 10}$$

$$= 0$$

$$d_{RC3}(i,j) = \frac{r_j \times (c_i+1) + r_i \times (c_j+1)}{(r_i + r_j + r_{ij}) \times (c_i + c_j + c_{ij} + 1)}$$

$$= \frac{10+10}{20 \times 11}$$

$$= 0.09$$

Entropy-Based Distances (109b):

$$d_o(I) = |I||s|H(I)$$

$$= 20 \times 10 \times \frac{2 \times \left(2 \times \left(-\frac{1}{2}\ln\frac{1}{2}\right) / \ln 2\right)}{2}$$

$$= 20 \times 10$$

$d_c(I)$=number of different values for the joint attributes=4

$d_c(I)$=number of different combinations for the each attributes=8 or normalized as $$\frac{8}{2 \times \binom{4}{2}} = 0.5$$

Figure 16:
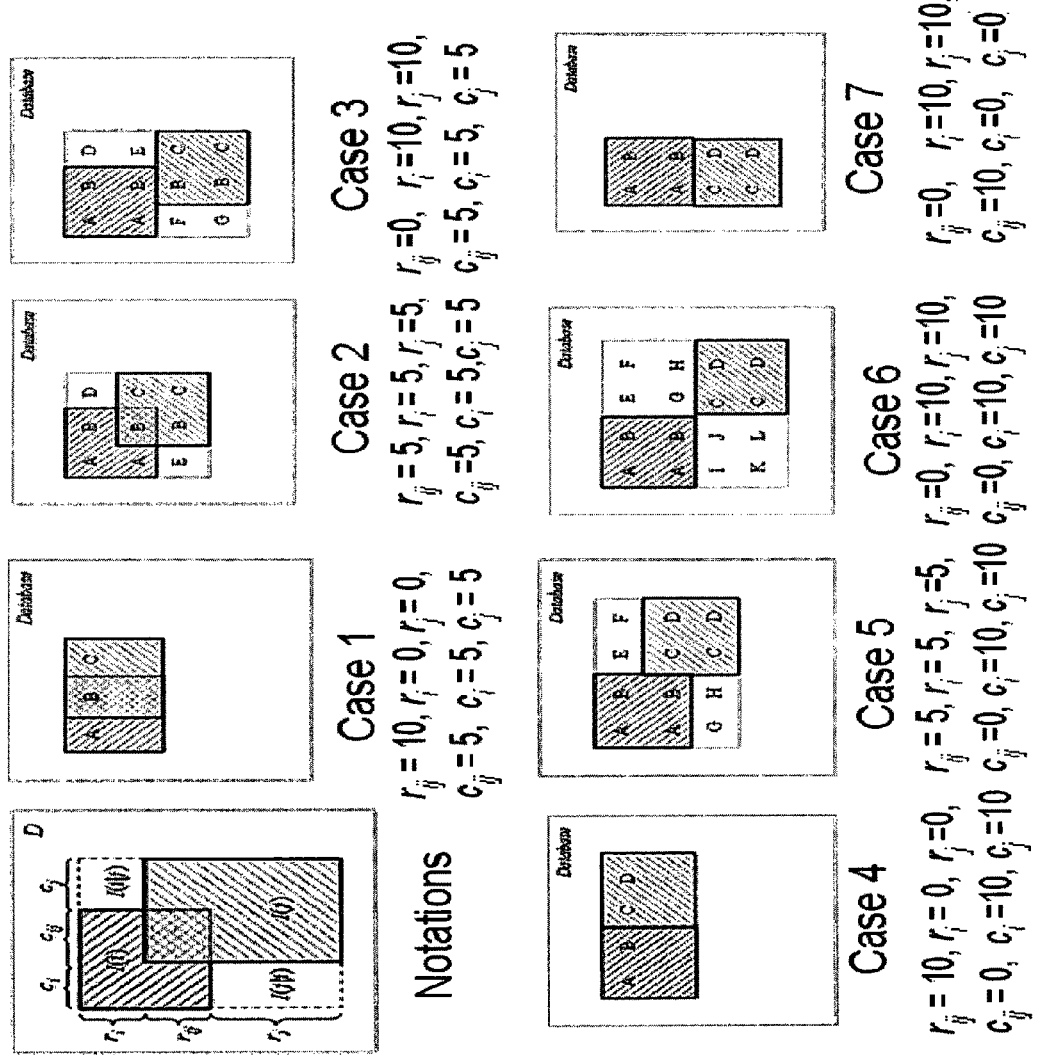

A summary comparing distance measures 109 is provided in FIGS. 16 and 17.

Any element in a claim that does not explicitly state "means for" performing a specified function, or "step for" performing a specific function, is not to be interpreted as a "means" or "step" clause as specified in 35 U.S.C. §112, paragraph 6.

It will be appreciated by those skilled in the art that the invention can take many forms, and that such forms are within the scope of the invention as claimed. Therefore, the spirit and scope of the appended claims should not be limited to the descriptions of the preferred versions contained herein.

We claim:

1. A computerized method for analyzing relationships among patterns within a data set having a set of samples and a corresponding attribute value for each attribute of each said sample, the method implemented as a set of instructions for execution by a processor, the method comprising:

receiving at a computer interface at least two patterns, the computer interface coupled to the computer processor;

defining a data cluster within the data set for each of said at least two patterns, each defined data cluster having samples with attribute values associated with a corresponding pattern of said at least two patterns;

grouping at least some of the samples of each defined data cluster with one another to generate a resultant data cluster;

calculating a variation between the attribute value of a first set of samples and the attribute value of a second set of samples within said resultant data cluster, the attribute value of the first set of samples and the second set of samples corresponding to the same attribute; and outputting the variation as data representing a measure of relevance of the first set of samples with the second set of samples.

2. The method according to claim 1, wherein defining the data cluster comprises defining a minimal subset of data within the data set having attribute values associated with the corresponding pattern.

3. The method according to claim 1, wherein the defined data cluster includes samples with attribute values associated with a plurality of said at least two patterns.

4. The method according to claim 1, wherein grouping at least some of the samples of each defined data cluster with one another to generate the resultant data cluster further comprises: grouping all of the samples and attributes of each defined data cluster to provide a resultant data cluster having attribute values for each of the samples and attributes of each defined data cluster.

5. The method according to claim 1, wherein grouping at least some of the samples of each defined data cluster with one another comprises grouping common samples having same attribute values for same attributes associated with each defined data cluster to define an overlapping data portion and generate the resultant data cluster.

6. The method according to claim 4, wherein the resultant data cluster comprises at least one corner region having attribute values associated with samples and attributes located outside each defined data cluster, and wherein calculating the variation further comprises calculating the variation between the first set of samples and the second set of samples within each one of said at least one corner region.

7. The method according to claim 6, wherein calculating the variation further comprises calculating a joint entropy of the attribute values for each of the attributes of the first and second set of samples within each said at least one corner region and summing the calculated entropies corresponding to each at least one corner region to provide the variation.

8. The method according to claim 4, wherein calculating the variation between the attribute values of the first and second set of samples comprises calculating a joint entropy of the attribute values for each of the attributes of the first and second set of samples within the resultant data cluster.

9. The method according to claim 1, wherein grouping at least some of the samples of each defined data cluster with one another further comprises grouping the data clusters in dependence upon a weighted combination of the data clusters.

10. The method according to claim 7, wherein calculating the variation further comprises weighting the calculated entropy by a measured number of samples and attributes in each of said at least one corner regions.

11. The method according to claim 8, wherein calculating the variation further comprises weighting the calculated entropy by a measured number of samples and attributes in the resultant data cluster.

12. The method according to claim 10, wherein calculating the variation further comprises normalizing the calculated entropy by an expected possible number of values for each attribute within each of said at least one corner regions.

13. The method according to claim 11, wherein calculating the variation further comprises normalizing the calculated entropy by an expected possible number of values within the resultant data cluster.

14. The method according to claim 1, wherein calculating the variation is in dependence upon a count of the number of common samples and attribute values shared between the defined data clusters.

15. The method according to claim 14, wherein calculating the variation is further in dependence upon a count of the number differing samples and the number of differing attribute values corresponding to the defined data clusters.

16. The method according to claim 1, wherein the first set of samples and the second set of samples are the same samples.

17. The method according to claim 1 further comprising the step of communicating the variation to a storage for subsequent access by a pattern post processing task.

18. The method according to claim 17, wherein the storage is a distance measure repository.

19. The method according to claim 17, wherein the variation is communicated across a network to the distance measure repository.

20. The method according to claim 17, wherein the post processing task is selected from the group consisting of: pattern clustering, pattern pruning, pattern summarization, pattern visualization, and pattern classification.

21. A computerized system for analyzing relationships among patterns within a data set having a set of samples and a corresponding attribute value for each attribute of each said sample, the system comprises:
  a processor and a memory configured for implementing a plurality of modules comprising:
    a pattern inducing module of the plurality of modules configured for receiving at an input at least two patterns, and defining a data cluster within the data set for each of said at least two patterns, each defined data cluster having samples with attribute values associated with a corresponding pattern of said at least two patterns;
    a prototyping module of the plurality of modules configured for grouping at least some of the samples of each defined data cluster with one another to generate a resultant data cluster; and
    a distancing module of the plurality of modules configured for calculating a variation between the attribute value of a first set of samples and the attribute value of a second set of samples within said resultant data cluster, the attribute value of the first set of samples and the second set of samples corresponding to the same attribute, and configured for outputting the variation as data representing a measure of relevance of the first set of samples with the second set of samples.

22. The system according to claim 21, further comprising the pattern inducing module configured for defining a minimal subset of data within the data set having attribute values associated with the corresponding pattern.

23. The system according to claim 21, wherein the defined data cluster includes samples with attribute values associated with a plurality of said at least two patterns.

24. The system according to claim 21, further comprising the prototyping module configured for grouping all of the samples and attributes of each defined data cluster to provide a resultant data cluster having attribute values for each of the samples and attributes of each defined data cluster.

25. The system according to claim 21, further comprising the prototyping module configured for grouping common samples having same attribute values for same attributes associated with each defined data cluster to define an overlapping data portion and generate the resultant data cluster.

26. The system according to claim 24, wherein the resultant data cluster comprises at least one corner region having attribute values associated with samples and attributes located outside each defined data cluster, and further comprising the distancing module configured for calculating the variation between the first set of samples and the second set of samples within each one of said at least one corner region.

27. The system according to claim 26, further comprising the distancing module configured for calculating a joint entropy of the attribute values for each of the attributes of the first and second set of samples within each said at least one corner region and summing the calculated entropies corresponding to each at least one corner region to provide the variation.

28. The system according to claim 24, wherein the distancing module configured for calculating the variation between the attribute values of the first and second set of samples comprises calculating a joint entropy of the attribute values for each of the attributes of the first and second set of samples within the resultant data cluster.

29. The system according to claim 21, further comprising the prototyping module configured for grouping the data clusters in dependence upon a weighted combination of the data clusters.

30. The system according to claim 27, further comprising the distancing module configured for weighting the calculated entropy by a measured number of samples and attributes in each of said at least one corner regions.

31. The system according to claim 28, further comprising the distancing module configured for weighting the calculated entropy by a measured number of samples and attributes in the resultant data cluster.

32. The system according to claim 30, further comprising the distancing module configured for normalizing the calculated entropy by an expected possible number of values for each attribute within each of said at least one corner regions.

33. The system according to claim 31, further comprising the distancing module configured for normalizing the calculated entropy by an expected possible number of values within the resultant data cluster.

34. The system according to claim 21, further comprising the distancing module configured for calculating the variation in dependence upon a count of the number of common samples and attribute values shared between the defined data clusters.

35. The system according to claim 34, further comprising the distancing module configured for calculating the variation in dependence upon a count of the number differing samples and the number of differing attribute values corresponding to the defined data clusters.

36. The system according to claim 21, wherein the first set of samples and the second set of samples are the same samples.

37. The system according to claim 21, wherein said at least two patterns are selected from the group comprising: event association patterns, correlation rules, frequent itemsets and association rules.

38. The system according to claim 21, wherein the variation as output is communicated to a storage for subsequent access by a pattern post processing task.

39. The system according to claim 38, wherein the post processing task is selected from the group consisting of: pattern clustering, pattern pruning, pattern summarization, pattern visualization, and pattern classification.

* * * * *